United States Patent [19]
Ichikawa et al.

[11] Patent Number: 5,266,930
[45] Date of Patent: Nov. 30, 1993

[54] DISPLAY APPARATUS

[75] Inventors: Hiroshi Ichikawa; Yoshiyuki Furuya; Makoto Takashima; Masao Suzuki; Kazuhiro Itami, all of Susono, Japan

[73] Assignee: Yazaki Corporation, Tokyo, Japan

[21] Appl. No.: 618,857

[22] Filed: Nov. 28, 1990

[30] Foreign Application Priority Data

| Nov. 29, 1989 | [JP] | Japan | 1-307751 |
| Jan. 29, 1990 | [JP] | Japan | 2-6128[U] |
| Jan. 29, 1990 | [JP] | Japan | 2-16245 |
| Jan. 31, 1990 | [JP] | Japan | 2-19257[U] |
| Feb. 13, 1990 | [JP] | Japan | 2-11927 |
| Apr. 3, 1990 | [JP] | Japan | 2-35446[U] |

[51] Int. Cl.⁵ ............................ G09G 3/02
[52] U.S. Cl. ............................ 345/8; 359/630; 359/632
[58] Field of Search ........... 340/705, 712, 980; 350/174, 3.7, 104; 353/13, 14; 358/103, 91; 2/6, 413; 359/13, 14, 630, 632

[56] References Cited

U.S. PATENT DOCUMENTS

| 2,641,159 | 6/1953 | Mihalakis | 353/14 |
| 3,833,300 | 9/1974 | Rymes | 356/13 |
| 4,465,347 | 8/1984 | Task et al. | 350/538 |
| 4,470,263 | 9/1984 | Lehovec et al. | 62/259.3 |
| 4,689,836 | 9/1987 | Vitaloni | 2/424 |
| 4,735,473 | 4/1988 | Migozzi et al. | 350/3.7 |
| 4,830,464 | 5/1989 | Cheysson et al. | 350/174 |
| 4,925,272 | 5/1990 | Ohshima et al. | 340/705 |
| 4,944,044 | 7/1990 | Zarotti | 2/413 |
| 5,005,010 | 4/1991 | Misaki et al. | 350/174 |
| 5,040,058 | 8/1991 | Beamon, III | 358/60 |

FOREIGN PATENT DOCUMENTS

| 0286496 | 3/1988 | European Pat. Off. | 340/705 |
| 1459814 | 12/1976 | United Kingdom . | |

Primary Examiner—Ulysses Weldon
Assistant Examiner—Amare Mengistu
Attorney, Agent, or Firm—Nikaido, Marmelstein, Murray & Oram

[57] ABSTRACT

The present invention is directed to a display apparatus which can display information well and does not compromise the feel of a helmet in which the display apparatus is incorporated. The helmet has a front opening formed therein and has a transparent shield mounted thereon so as to cover the front opening. The display apparatus incorporates a display unit disposed on the inner side of the helmet for displaying information thereon. Display light from the display unit is reflected toward a visual point position by an inner face of the shield so that an observer visually observes a virtual image of the display information of the display unit from within the helmet through the shield. The display unit is disposed on the inner side of a chin portion of the helmet so as to not to create any obstruction to the observer.

19 Claims, 13 Drawing Sheets

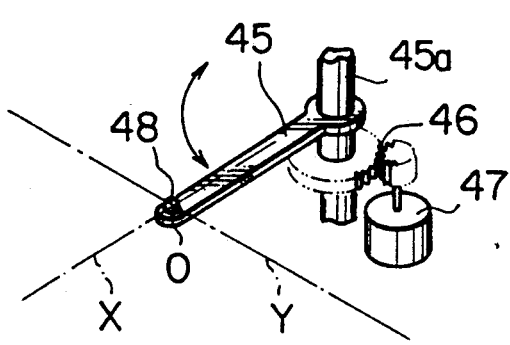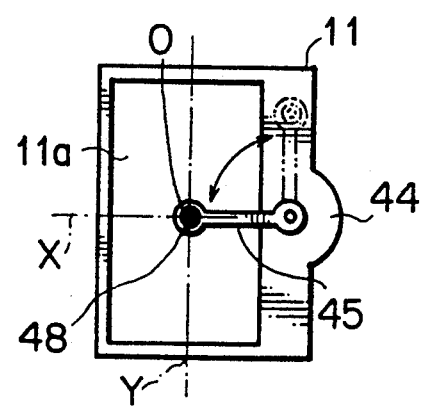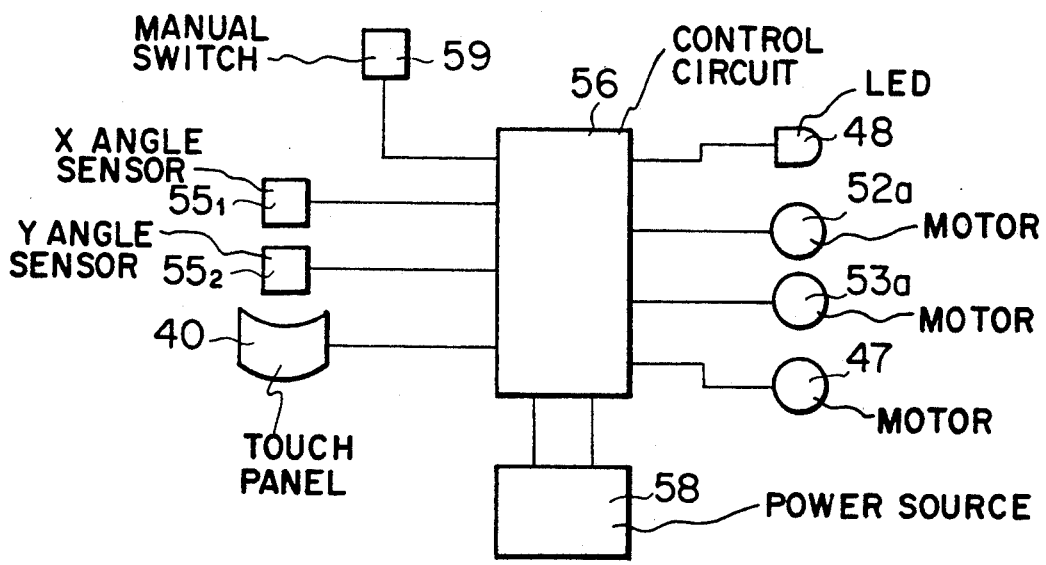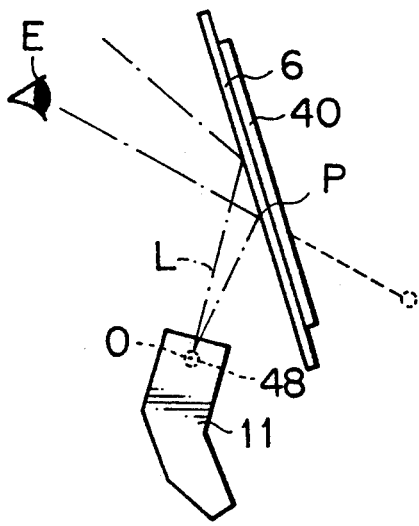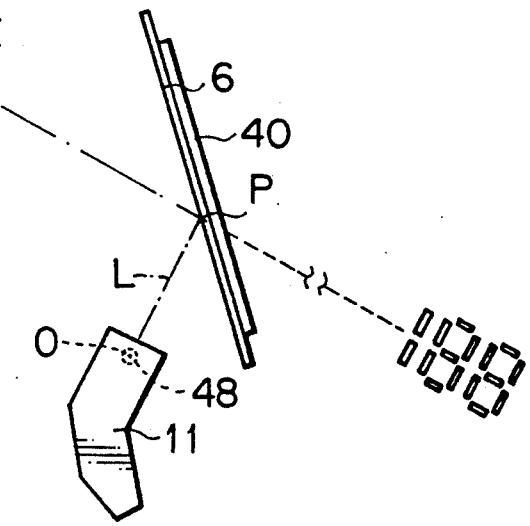

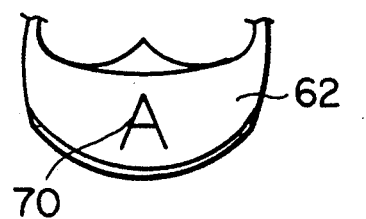
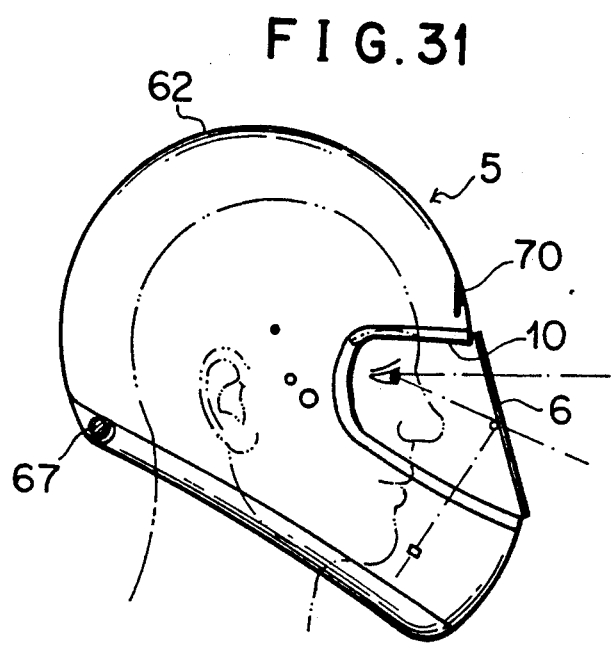
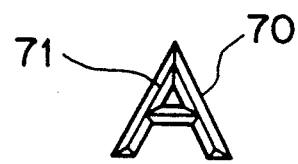
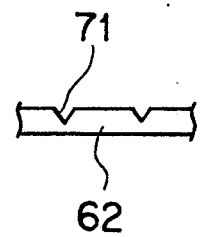
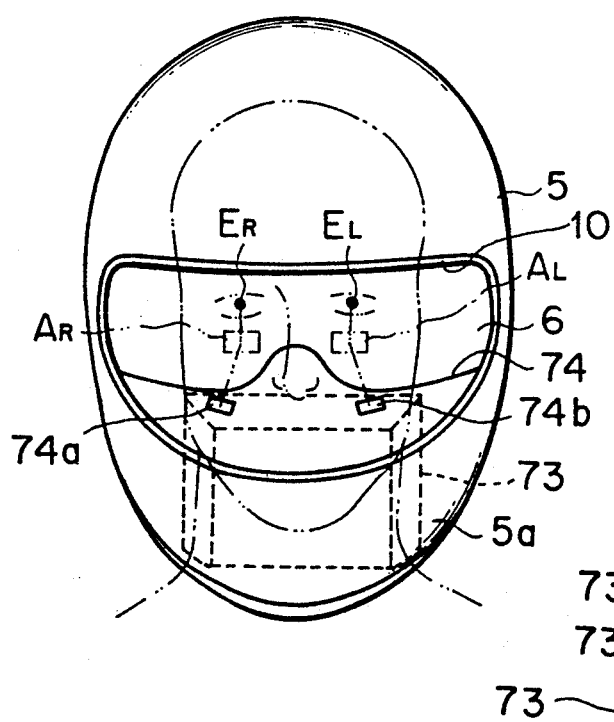
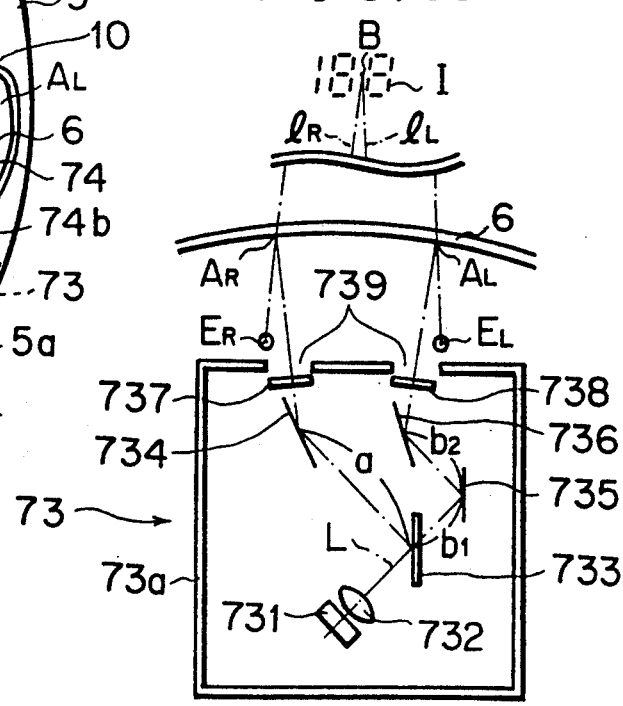

DISPLAY APPARATUS

BACKGROUND OF THE INVENTION

1. Field of the Invention

This invention relates to a display apparatus, and more particularly to a display apparatus of the type which is built in a helmet and provides visual observation of display information from a display unit while the helmet is worn by a user.

2. Description of the Prior Art

Display apparatuses in the prior art have been incorporated in helmets for a pilots of vehicle such as an aircraft or a helicopter for displaying various types of information including the velocity of the vehicle.

An example of such a conventional display apparatus is shown in FIG. 43. Referring to FIG. 43, a tubular cathode ray tube (CRT) 101 for displaying various display information thereon is installed in a helmet (not shown). A reflecting mirror 102 is disposed adjacent an output end of the CRT 101 and reflects image light from the CRT 101 toward a lens 103 so that such image light is focused by the lens 103. A reflecting plate 104 is disposed on an output or light outgoing side of the lens 103 and reflects display light from the CRT 101 toward a visual point position (i.e., an eye of an observer wearing the helmet) so that display information transmitted from the CRT 101 by way of the reflecting mirror 102 and lens 103 may be visually observed by the observer.

The display apparatus, however, is considerably dangerous for the observer in that a high voltage is required to operate the CRT 101.

Such a display apparatus as shown in FIG. 44 is also conventionally known. The display apparatus of FIG. 44 is a modified version of the display apparatus shown in FIG. 43 in that the reflecting mirror 102 and the reflecting plate 104 of the display apparatus shown in FIG. 43 are eliminated, and instead a shield 106 of the helmet 105 is used as a reflecting element to reflect display light from the CRT 101 toward an eye E of an observer wearing the helmet 105. In the display apparatus of FIG. 44, a display image of the CRT 101 is enlarged by the lens 103 and reflected by the shield 106 so that a virtual image I of the display image can be visually observed from the visual point position E while the helmet 105 is worn by an observer. However, with the display apparatus, since the visual point position is near the shield, a display image is observed with only one eye. Accordingly, this display apparatus is has disadvantage, in addition to such possible danger arising from employment of a CRT as described above, in that an observer will be weary after use for a long period of time and the visual observability is not good.

Another display apparatus which eliminates the defect arising from disposition of a CRT in a helmet is also known and shown in FIG. 45. Referring to FIG. 45, the display apparatus includes a CRT 101 and a lens 103 which, however, are provided separately from a helmet 105 in which information is to be displayed. In particular, display information from the lens 103 is transmitted to the helmet 105 by way of an optical cable 107 which has an end thereof remote from the lens 103 introduced into the inside of a shield 106 of the helmet 105. Thus, an image of the display information is formed on an inner face of the shield 106 and visually observed by an observer.

With this display apparatus, however, since the optical cable 107 employed is comparatively low in flexibility, the optical cable 107 becomes an obstruction to the observer when the observer wears the helmet 105.

Such a display apparatus as shown in FIG. 46 has also been proposed which eliminates the drawbacks described above that arise from the fact that a visual point position is near a shield of a helmet as in the display apparatus shown in FIG. 44. Such a display apparatus is disclosed, for example, in Japanese Patent Laid-Open No. 44984/1989 and is constructed such that a user will wear a unit 110 in which two CRTs (not shown) are accommodated and display images of the CRTs are introduced into a helmet 105 from the unit 110 by way of a pair of optical cables 107. The display images of the CRTs may be projected to two locations of a shield 106 of the helmet 105. With the display apparatus, a user can combine and visually observe, with both eyes, display images reflected at the two locations of the shield 106.

With this display apparatus, however, since two CRTs are employed as display devices and the unit 110 in which the CRTs are accommodated is provided outside the helmet 105, there are drawbacks that the entire apparatus is large and that the unit 110 may become a hindrance to the user.

A further conventional display apparatus as shown in FIG. 47 eliminates the drawbacks of the conventional display apparatus described above. Referring to FIG. 47, the display apparatus includes a light emitting diode (LED) display 108 disposed on an inner face of the upper portion of a helmet 105. Display information of the LED display 108 is projected to an inner face of a shield 106 of a helmet 105 by way of a prism 109 so that it may be visually observed by an observer.

With this conventional display apparatus, however, since the display unit is located at an upper portion or alternatively at a left or right side portion of the helmet, the center of gravity of the helmet is at a comparatively high location. Consequently, an observer who wears the helmet may have an uneasy feeling, since the helmet itself is not balanced during use. Further, since a combiner of the helmet is required separately from the shield in order to obtain a desirable reflecting direction of display light and is located in the proximity of an eye of the observer, it may possibly present some risk to the observer.

Further, while display information is displayed with considerable safety since the LED display 108 is employed as a display device instead of a CRT, the display apparatus shown in FIG. 47 is disadvantageous in that the brightness of display information is comparatively low. Particularly, when the illuminance of external light is high such as in the daytime or in a counterlight condition, display information cannot be visually observed well.

Besides, with the conventional display apparatus shown in FIG. 47, a power source for driving the display device is required. If power is supplied directly to the display device of the helmet, for example, from a battery carried on a vehicle by way of a power supply cable, then such a power supply cable will become an obstruction to the driver of the vehicle. However, if an electric cell is instead installed in the helmet, then such an electric cell must be replaced at a suitable time, which is cumbersome. If a battery which can be recharged is installed in the helmet, then such an exchanging of the battery is unnecessary. However, the helmet cannot be used while the battery is being charged.

SUMMARY OF THE INVENTION

It is an object of the present invention to provide a display apparatus which can display information well and does not inpair the feel or balance of a helmet in which the display apparatus is incorporated during use.

It is another object of the present invention to provide a display apparatus wherein an appropriate display image can be visually observed in response to a visual point position and the orientation of a display unit can be adjusted automatically by a simple operation.

It is a further object of the present invention to provide a display apparatus which can display information with a suitable degree of brightness even when the illuminance of external light is high.

It is a still further object of the present invention to provide a display apparatus with a simplified structure wherein a display image can be visually observed with both eyes.

It is a yet further object of the present invention to provide a display apparatus which can supply power readily and stably to a display device.

In order to attain the objects, according to an aspect of the present invention, there is provided a display apparatus for use with a helmet which has a front opening formed therein and has a transparent shield mounted thereon in such a manner as to cover the front opening. The display apparatus incorporates a display unit for displaying information thereon, the display unit being disposed on the inner side of a chin portion of the helmet such that display light therefrom is reflected toward a visual point position by an inner face of the shield to allow an observer to visually observe a virtual image of the display information of the display unit from within the helmet through the shield.

With this display apparatus, a display image is formed by the display unit, and such a display image is reflected by the inner face of the shield to form a virtual image which is visually observed from within the helmet by the observer who wears the helmet. Accordingly, the display image can be visually observed well. Further, since the display unit is disposed on the inner side of the chin portion of the helmet and the display image is reflected by the shield, the display unit does not become an obstruction to the observer at all and will not impair the feel of the helmet during use. Besides, the safety is improved.

According to another aspect of the present invention, there is provided a display apparatus for use with a helmet which has a front opening formed therein and has a transparent shield mounted thereon in such a manner as to cover the front opening. The display apparatus includes display unit for displaying information thereon, the display unit being disposed on the inner side of a chin portion of the helmet such that display light therefrom is reflected toward a visual point position by an inner face of the shield to allow an observer to visually observe a virtual image of the display information of the display unit from within the helmet through the shield, means for supporting the display unit for pivotal motion about a fulcrum at a fixed point on or in the proximity of an optical axis of display light from the display unit, unit driving means for changing the orientation of the display unit about the fulcrum, a reference light source disposed on the display unit for emitting reference light toward the shield to indicate, with a point on the shield at which the reference light is reflected, a position of the fulcrum when the shield is viewed, angle detecting means for detecting orientation of the display unit, a transparent touch panel disposed on an outer face of the shield indicating the point as a portion to be depressed, and controlling means for identifying the depressed portion on the touch panel and controlling, in accordance with the thus identified depressed position and the orientation of the display unit detected by the angle detecting means, the unit driving means to pivot the display unit so that the optical axis of the display light from the display unit may be directed to the position of the identified depressed portion of the touch panel.

With the display apparatus, display light from the display unit disposed on the inner side of the chin portion of the helmet is reflected by the shield of the helmet to form a virtual image thereof in front of the helmet. Consequently, the user can visually observe the virtual image of the display image through the shield of the helmet.

Meanwhile, reference light from the reference light source is reflected by the shield so that a position of the fulcrum when the shield is viewed is indicated to the user. Then, when the touch panel disposed on the outer face of the shield is depressed, the controlling means identifies the depressed portion and thus controls the unit driving means to pivot the display unit until the optical axis of the display light from the display unit is directed to the position of the identified depressed portion of the touch panel.

Accordingly, if the user depresses the position on the touch panel in the direction toward the fulcrum indicated by the reference light from the reference light source, then the optical axis of the display light is directed to the visual point passing a point on the shield corresponding to the depressed portion. Consequently, the display unit is adjusted so that an appropriate display image may be visually observed.

According to a further aspect of the present invention, there is provided a display apparatus for use with a helmet which has a front opening formed therein and has a transparent shield mounted thereon in such a manner as to cover the front opening. The apparatus incorporates display unit for displaying information thereon, the display unit being disposed in the helmet such that display light therefrom is reflected toward a visual point position by an inner face of the shield to allow an observer to visually observe a virtual image of the display information of the display unit from within the helmet through the shield, the display unit being of the backlit type, and a light collecting plate mounted on an outer face of the helmet for collecting external light and emitting the thus collected external light toward the back side of the display unit.

With the display apparatus, external light is collected by the light collecting plate, and the thus collected external light is irradiated upon the display unit of the backlit type. The display unit thus emits or transmits light in accordance with display information transmitted thereto, and such display light is reflected by the shield to form a virtual image which is visually observed by the observer. Thus, when the illuminance of external light is high such as when the sky is clear or in a counterlight condition, very intense light can be collected by the light collecting plate. Consequently, the illuminance of light irradiated from the light collecting plate is high. On the other hand, when the illuminance of external light is low such as when the sky is cloudy or rainy, such weak light is collected by the light collecting plate, and consequently, the illuminance of light irradiated from the light emitting portion is low. As a result, with this display apparatus, light of a suitable intensity with respect to the illuminance of external light can be irradiated upon the liquid crystal element, and display information can be visually observed well.

According to a still further aspect of the present invention, there is provided a display apparatus for use with a helmet which has a front opening formed therein and has a transparent shield mounted thereon in such a manner as to cover the front opening. The apparatus includes a display unit for displaying information thereon, the display unit being disposed on the inner side of a chin portion of the helmet such that display light therefrom is reflected toward a visual point position by an inner face of the shield to allow an observer to visually observe a virtual image of the display information of the display unit from within the helmet through the shield, a beam splitter for splitting display light from the display unit into two beams of light, a first reflecting mirror for reflecting one of the two beams of light from the beam splitter toward the shield, a second reflecting mirror for reflecting the other beam of light, and a third reflecting mirror for reflecting the beam of light reflected from the second reflecting mirror toward the shield, the beams of light from the first and third reflecting mirrors being reflected at two predetermined left and right symmetrical locations of the shield such that optical axes of the beams of light reflected from the shield are intersected with each other at a predetermined point in front of the shield at which the virtual image is formed.

With this display apparatus, display light from the display unit is split into two beams of light, and one of the two beams of light is reflected toward the shield by the first reflecting plate while the other beam of light is reflected first by the second reflecting mirror and then by the third reflecting mirror toward the shield. In this instance, the two beams of light from the first and third reflecting mirrors are reflected at the two predetermined left and right symmetrical locations of the shield, and the individual beams of light reflected from the shield are directed as if they are emitted from the predetermined one point forwardly of the shield, and virtual images by the two beams of light are formed at the same position.

Accordingly, if the observer looks at the predetermined left and right symmetrical locations, then a display image can be visually observed with both eyes.

According to a yet further aspect of the present invention, there is provided a display apparatus for use with a helmet which has a front opening formed therein and has a transparent shield mounted thereon in such a manner as to cover the front opening. The apparatus includes a display unit for displaying information thereon, the display unit being disposed in the helmet such that display light therefrom is reflected toward a visual point position by an inner face of the shield to allow an observer to visually observe a virtual image of the display information of the display unit from within the helmet through the shield, a solar battery disposed on an outer face of the helmet for supplying power to the display unit, an internal battery disposed in the helmet for supplying power when the output voltage of the solar battery is lower than a driving voltage of the display unit, and a charging terminal adapted to be connected to an external battery to charge the internal battery when the helmet is not worn.

With this display apparatus, display light from the display unit is reflected by the shield of the helmet to form a virtual image which is visually observed by the observer as the display image. In this instance, when the illuminance of external light is sufficiently high, power is supplied from the solar battery to the display unit, but when the illuminance of external light is not sufficiently high, power is supplied from the internal battery to the display unit. On the other hand, when the helmet is not worn, if the charging terminal of the helmet is connected to an external battery such as a car-carried battery of a vehicle, the internal battery is charged from the external battery while it can be charged also from the solar battery. Accordingly, stabilized power can be supplied to the display unit both in the daytime and at night. As a result, the necessity of a power supply cable is eliminated, and the display apparatus is not a hindrance to, for example, the driving operation of the vehicle by the user. Besides, since no exchanging operation of a cell or the like is required, the convenience of use of the display apparatus is improved significantly.

The above and other objects, features and advantages of the present invention will become apparent from the following description and the appended claims, taken in conjunction with the accompanying drawings in which like elements or parts are denoted by like reference characters all through the drawings.

BRIEF DESCRIPTION OF THE DRAWINGS

FIG. 17 is a perspective view showing a mechanism for moving a light emitting diode (LED) of the display apparatus of FIG. 12;

FIG. 18 is a diagrammatic view illustrating a range of movement of the LED shown in FIG. 17;

FIG. 19 is a block diagram showing electric construction of the display apparatus of FIG. 12;

FIGS. 21 and 22 are diagrammatic representations illustrating angle correction of the display apparatus of FIG. 12;

FIG. 28 is a front elevational view of part of the display unit shown in FIG. 26;

FIGS. 29 and 30 are an enlarged front elevational view and an enlarged sectional view, respectively, showing an emblem of the display unit shown in FIG. 28;

FIG. 31 is a side elevational view of a still further helmet in which a modification to the display apparatus shown in FIG. 25 is incorporated;

FIG. 32 is a front elevational view of a yet further helmet in which a display apparatus is incorporated showing a seventh embodiment of the present invention;

FIG. 33 is a diagrammatic illustration showing an optical system of the display apparatus of FIG. 32;

DESCRIPTION OF THE PREFERRED EMBODIMENTS

Figure 1:
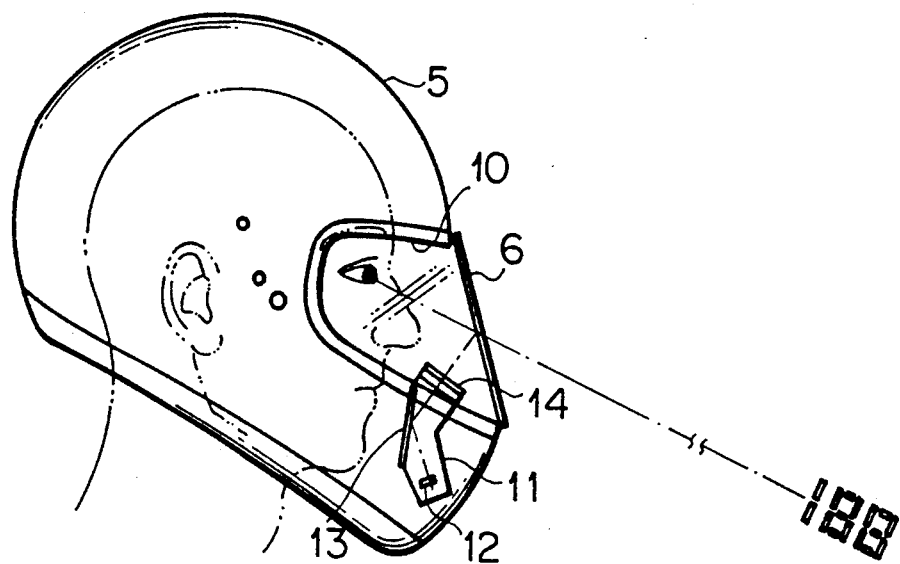
FIG. 1 is a schematic side elevational view of a helmet in which a display apparatus is incorporated showing a first embodiment of the present invention.

Referring first to FIG. 1, there is shown a helmet in which a display apparatus to which the present invention is applied is incorporated. The helmet shown is denoted at 5 and is adapted to be worn by a driver of a motorcycle or the like. The helmet 5 has an opening 10 formed in a front wall thereof so that a user wearing the helmet 5 may have an external field of view therethrough, and a transparent shield 6 is attached to the helmet 5 so as to cover the opening 10.

A display unit 11 substantially L-shaped in side elevation is disposed on the inner side of a front portion of the helmet 5 such that upper and lower end portions thereof may be positioned on the front side of the helmet 5. A liquid crystal element 12 serving as a display element for displaying desired display information thereon is disposed at a lower end portion of the display unit 11. The liquid crystal element 12 is composed of a large number of liquid crystal cells disposed in a matrix, and when a voltage is applied across a cell, the cell becomes transparent. Thus, if a voltage is selectively applied to the liquid crystal cells of the liquid crystal element 12 in accordance with desired information, then light from a light source (not shown) disposed below the liquid crystal element 12 is transmitted through those cells to provide a display image corresponding to the information. A reflecting plate 13 is disposed on the inner side of the bent corner of the display unit 11 while an optical unit 14 including a plurality of lenses is disposed at an upper end portion of the display unit 11 to form an image of display information from the liquid crystal element 12 on an inner face of the shield 6.

It is to be noted that display information may be transmitted to the liquid crystal element 12 by suitable means such as a signal cable or by way of radio waves.

In operation, light is irradiated upon a rear side of the liquid crystal element 12 from the light source and a voltage is selectively applied to the liquid crystal element 12 in accordance with desired display information to make the display portion of the liquid crystal element 12 transparent. Consequently, light from the light source is transmitted through the transparent portion of the liquid crystal 12 to form a display image. Then, light of the display image is reflected by the reflecting plate 13 and then introduced to the inner face of the shield 6 by way of the optical unit 14. Consequently, a virtual image is formed at a predetermined position on the outer side of the shield 6, and an observer will visually observe the virtual image as the display image. In this instance, when the illuminance of external light is high such as when the sky is clear or in a counterlight condition, light of a suitable intensity with respect to an illuminance of external light can be irradiated upon the liquid crystal element 12 by adjusting the illuminance of the light source to a high level.

Thus, since a display image is formed by irradiating light from the light source upon the rear side of the liquid crystal element 12, the display image can be visually observed well. Further, since the display unit 11 has a substantially L-shaped configuration and the liquid crystal element 12 is disposed on the front side of the helmet 5 such that a display image is reflected toward the shield 6 by the reflecting plate 13, no component of the display apparatus in the helmet 5 obstructs the wearer of the helmet 5 at the chin, and safety is improved without impairing the feel of the helmet 5.

It is to be noted that the optical unit 14 of the display unit 11 may be eliminated when a hologram plate is placed on the shield 6 of the helmet 5 so that a display image from the liquid crystal element 12 may be projected upon the hologram plate so as to create a hologram image visually observable by a wearer of the helmet 5.

Figure 2:
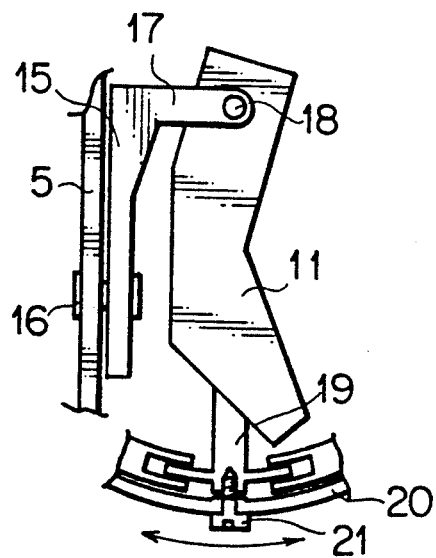
FIG. 2 is a side elevational view of a display unit of a display apparatus showing a second embodiment of the present invention.
Figure 3:
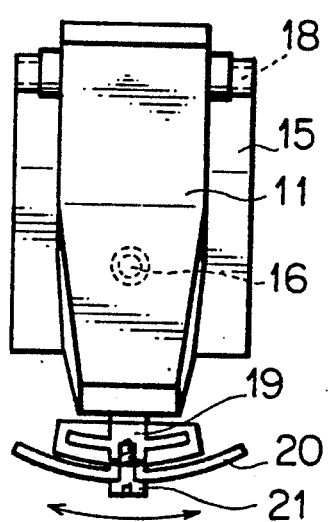
FIG. 3 is a front elevational view of the display unit of FIG. 2.
Figure 4:
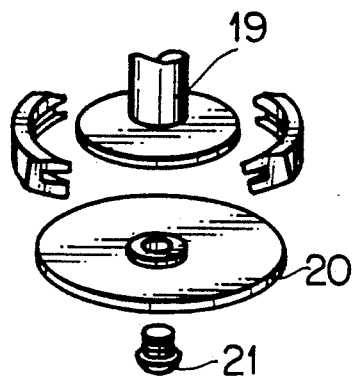
FIG. 4 is a fragmentary perspective view of an adjusting shaft and associated members of the display unit of FIG. 2.

Referring now to FIGS. 2 to 4, there is shown part of a display apparatus according to a second embodiment of the present invention. The display apparatus includes a unit holding member 15 mounted at a substantially central portion thereof for leftward and rightward rocking motion about a supporting pin 16 in a helmet 5. A pair of holding arms 17 are formed at and extend forward from the opposite ends of an upper portion of the unit holding member 15. A display unit 11 is mounted on and between the holding arms 17 of the unit holding member 15 for forward and backward rocking motion by means of a pair of support shafts 18 about an axis common to the support shafts 18.

An adjusting shaft 19 is securely mounted at a lower portion of the display unit 11 and has a disk-like portion formed at a lower end portion thereof. An adjusting disk 20 is securely mounted at a lower end of the adjusting shaft 19 by means of a fastening screw 21.

Figure 5:
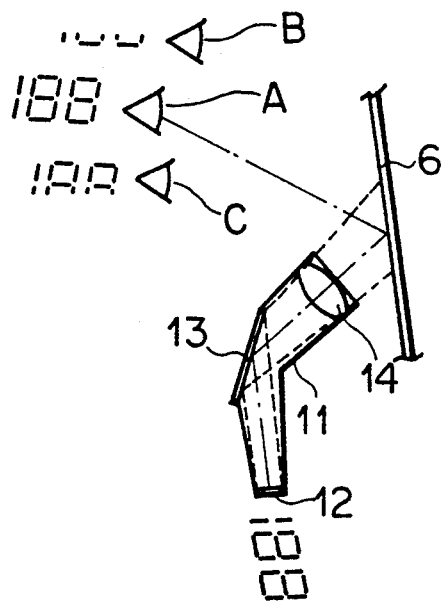
FIGS. 5 and 6 are diagrammatic representations illustrating a relationship between a display image and a visual point position.
Figure 6:
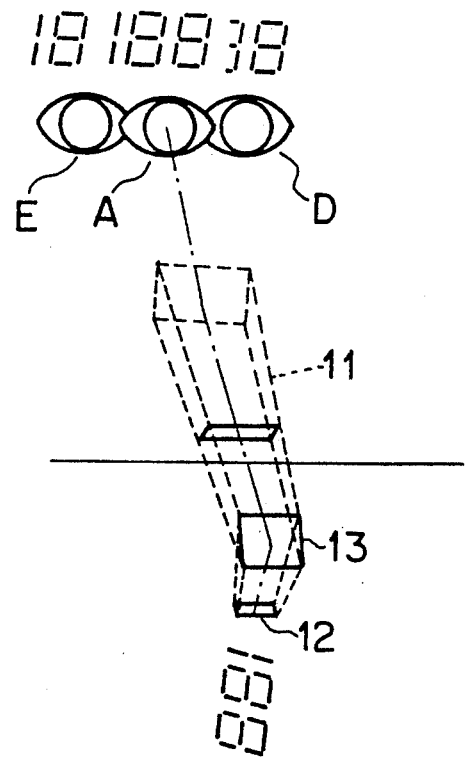
Figure 7:
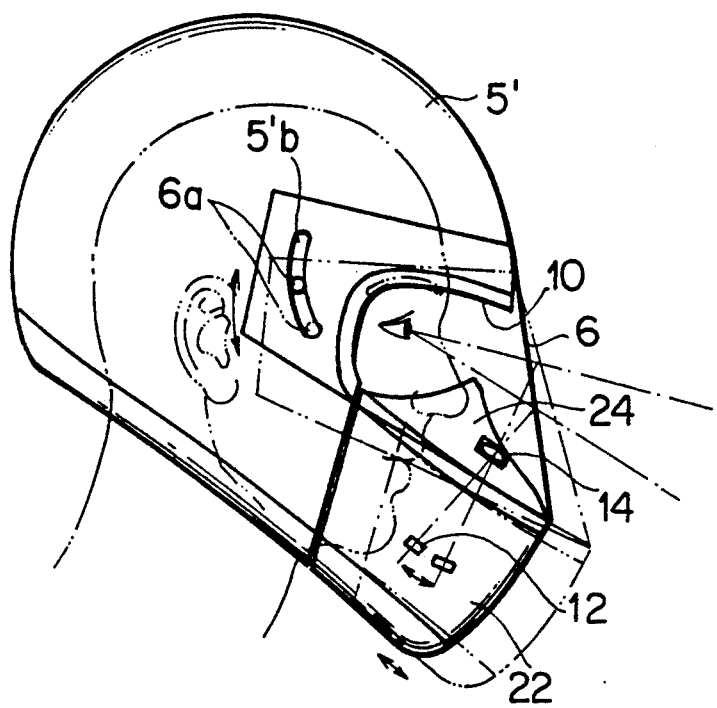
FIG. 7 is a schematic side elevational view of another helmet in which a display apparatus is incorporated showing a third embodiment of the present invention.
Figure 8:
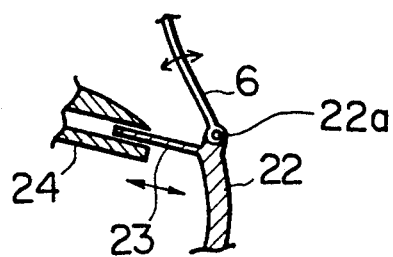
FIG. 8 is an enlarged vertical sectional view of a chin cover of the helmet of FIG. 7.
Figure 9:
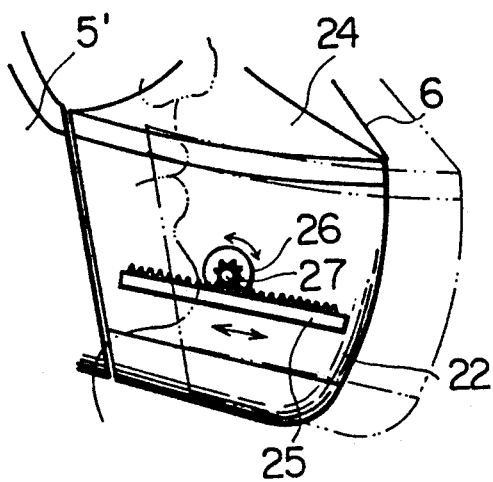
FIG. 9 is a schematic side elevational view of the chin cover of the helmet of FIG. 7.

The adjusting disk 20 can be manually moved forward or backward to the or left or right so as to rock the display unit 11 about the supporting pin 16 on the unit holding member 15 or the support shafts 18. Then, if the fastening screw 21 is tightened, then the display unit 11 is fixedly installed at a desired angular position at which a virtual image of a display image from the display unit 11 is formed at a desired position on the shield (not shown) of the helmet 5. In particular, since the height of and the distance between the eyes are different for each individual in accordance with the size of the head and so forth, the position of the eyes, that is, the visual point position, may be so different with an individual when the helmet 5 is worn that a display image from the display unit 11 may not be appropriately visually observable as seen in FIGS. 5 and 6. Referring to FIG. 5, if a display image is observed from the visual point position B or C displaced upward or downward from the correct visual point position A, a cut will appear at an upper or lower portion of the display image. On the other hand, when a display image is observed from a visual point position D or E displaced to the left or right from the correct visual point position A, a cut will appear at a left or right portion of the display image as seen in FIG. 6. With the display apparatus of the present embodiment, however, since the display unit 11 can be installed at a desired angular position and the image forming position at which a display image is to be formed can be adjusted by the wearer, a display image can be formed at an optimum position for a wearer of the helmet 5.

Referring now to FIGS. 7 to 11, there is shown a display apparatus according to a third embodiment of the present invention. A helmet 5' in which the display apparatus is incorporated is a modification to the helmet 5 shown in FIG. 1 in that a chin portion of the helmet 5 for covering the chin of a wearer is formed as a separate member or chin cover 22. A guide bar 23 is formed on and extends inwardly from an inner face of the chin cover 22. A shield 6 is mounted at a lower end thereof for pivotal motion at an upper edge of the chin cover 22 by means of a pin 22a. The shield 6 has a pair of pins 6a mounted at the opposite side portions thereof while a pair of curved slits 5'b are formed on the opposite side walls of the helmet 5', and the pins 6a are individually received in the slits 5'b. A nose guard 24 is disposed on the helmet 5 on the inner side of the shield 6 and is held in sliding fitting engagement with the guide bar 23. When the guide bar 23 is slidably moved along the nose guard 24, the chin cover 22 can be moved forward or backward with respect to the helmet 5. Thereupon, the shield 6 can be moved following the chin cover 22 while the pins 6a thereon are guided along the curved slits 5'b of the helmet 5' so as to change the inclination of the shield 6. A rack 25 is mounted on an inner side face of the chin cover 22, and an output pinion 27 of a chin cover motor 26 mounted on the helmet 5 is held in meshing engagement with the rack gear 25.

Figure 10:
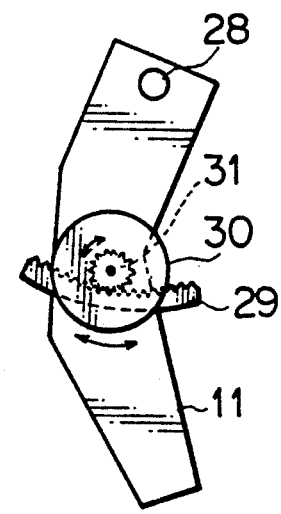
FIG. 10 is a side elevational view of a display unit of the display apparatus shown in FIG. 7.

Referring particularly to FIG. 10, a display unit 11 is mounted for forward and backward rocking motion around a holding pin 28 secured to the opposite side faces of an upper front portion of the helmet 5, and an arcuate rack 29 is mounted on a side face of the display unit 11. An output pinion 31 of a display unit motor 30 mounted on the helmet 5 is held in meshing engagement with the rack 29.

Figure 11:
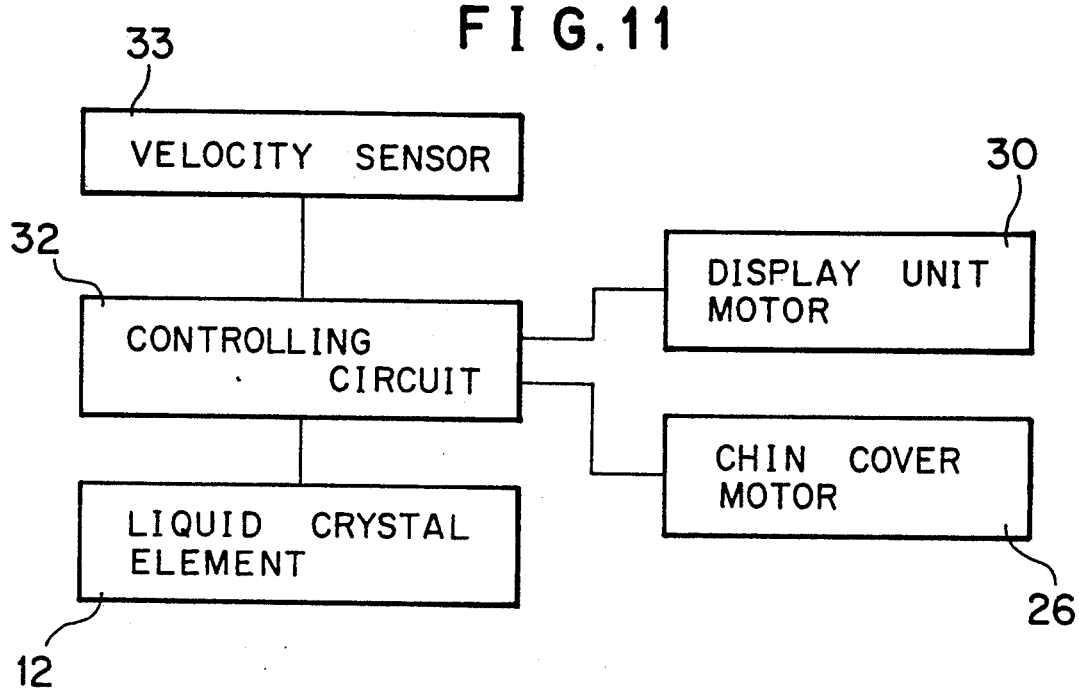
FIG. 11 is a block diagram showing a controlling device of the display apparatus of FIG. 7.

Referring now to FIG. 11, a velocity sensor 33 provided on a body of a vehicle such as a motorcycle for detecting the velocity of the vehicle is connected to a controlling circuit 32 of a control device not shown provided in the inside of the helmet 5. A liquid crystal element 12 of the display unit 11 is connected to the controlling circuit 32 so that a display image of the liquid crystal element 12 may be formed in accordance with velocity information from the velocity sensor 33. Meanwhile, the chin cover motor 26 and the display unit motor 30 are connected to the controlling circuit 32 so that they may be driven in response to velocity information from the velocity sensor 33.

With the display apparatus of the present embodiment, the velocity of the vehicle in which the display apparatus is incorporated is detected by the velocity sensor 33 and transmitted to the controlling circuit 32. The controlling circuit 32 thus controls the liquid crystal element 12 of the display unit 11 to form a display image on the inner face of the shield 6 so that it may be visually observed by a wearer of the helmet 5'. Then, when the velocity of the car body exceeds a predetermined fixed level, the chin cover motor 26 and the display unit motor 30 are energized under control of the controlling circuit 32 to project the chin cover 22 forward thereby rocking the display unit 11 forward about the holding pin 28 by way of the output pinions 27 and 31 and rack gears 25 and 29, respectively. Consequently, the inclination of the shield 6 is changed and the image forming position of a display image is moved upward. When the visual point of the wearer of the helmet 5 shifts such as upon high speed running of the vehicle, a display image can be formed at a position corresponding to the shifted visual point, thereby correcting for the movement of the visual point when the display image is to be visually observed. Accordingly, the display image can be visually observed with safety and with certainty.

Figure 12:
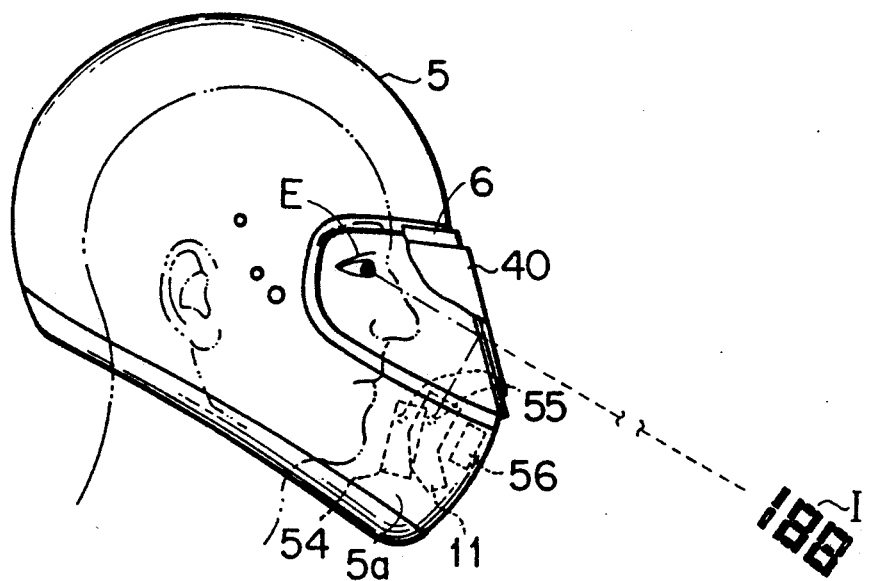
FIG. 12 is a side elevational view of a further helmet in which a display apparatus is incorporated showing a fourth embodiment of the present invention.

Referring now to FIG. 12, there is shown a display apparatus according to a fourth embodiment of the present invention. The display apparatus is also incorporated in a helmet 5 and includes a transparent touch panel 40 disposed on an outer face of a shield 6 of the helmet 5 for detecting, when it is depressed by a finger or the like, the position of a depressed portion. It is to be noted that the shield 6 and touch panel 40 are shown partly broken in FIG. 12.

The touch panel 40 may be of the matrix type wherein a large number of contact switches formed from transparent electrodes are disposed in a matrix and coordinate information of a depressed portion is obtained as a contact switch at the depressed point is put into a conducting state, or the analog type wherein a voltage is applied between a pair of opposed transparent conductive films and a potential at a depressed portion is detected to obtain coordinate information of the depressed portion.

An L-shaped display unit 11 is disposed on the inner side of a chin cover or chin portion 5a of the helmet 5 such that display light emerging from a top end thereof is reflected by the shield 6 to the inside of the helmet 5. Then, when viewed from a visual point E in the helmet 5, a virtual image I of a display image is visually observed in a forward field of view through the shield 6.

Various elements are disposed in the chin cover 5a, including a unit driving mechanism 54 for changing the orientation of the display unit 11 as hereinafter described, a pair of angle sensors 55 for detecting orientation of the display unit 11, and a controlling circuit 56 for controlling the unit driving mechanism 54 in accordance with signals from the touch panel 40 and angle sensors 55.

The controlling circuit 56 identifies, when a portion on the touch panel 40 is depressed, the position of the depressed point with respect to the shield 6 as hereinafter described, and executes detection of angles by way of the angle sensors 6 and control of the unit driving mechanism 54 to orient the display unit 11 toward the depressed portion thus identified.

Figure 13:
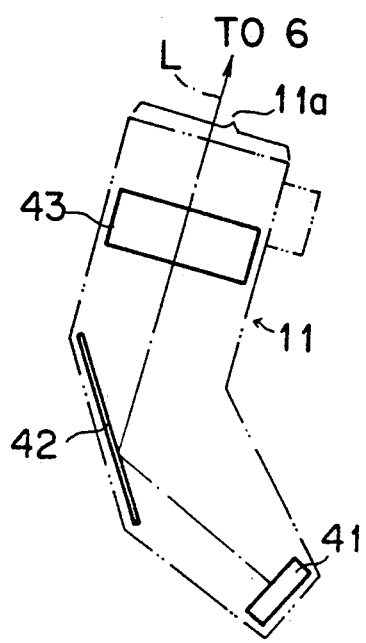
FIG. 13 is a diagrammatic view showing an optical system of a display unit of the display apparatus shown in FIG. 12.

Referring to FIG. 13, there is shown an optical system of the display unit 11. The optical system shown includes a display element 41 such as a fluorescent display tube disposed at a bottom portion on the inner side of the display unit 11 while a reflecting mirror 42 is disposed on an inner face of a bent corner of the display unit 11. Further, a lens system 43 such as a convex lens is disposed in the proximity of an upper opening 11a of the display unit 11. Then, display light from the display device 41 is reflected by the reflecting mirror 42 and directed toward the shield 6 by way of the lens system 43.

The display device 41 is set such that a display surface thereof may be positioned within a focal distance of the lens system 43, that is, between the lens system 43 and a focus of the lens system 43. When the opening 11a is viewed, a display image of the display device 41 is enlarged as compared with an actual display pattern on the display device 41 by the enlarging action of the lens system 43. The display image is visually observed at a position optically interior to or farther than the display device 41.

In particular, a virtual image of the display image of the display device 41 is formed remotely on an extension line of an optical axis 6 of the lens system 43. When an observer visually observes the virtual image by way of the shield 6, a remote display image is observed. Accordingly, focusing of the user's eyes is facilitated, and the display apparatus has a high observability.

It is to be noted that, if a remote enlarged display image is obtained in this manner, then a range within which an entire virtual image can be visually observed (visual area) is decreased based on relationships in size between the top opening 11a of the display unit 11 and the virtual image, and in distance from the virtual image to the opening 11a. Accordingly, when the visual point is neither on the extension line of the optical axis L nor in the neighborhood of the extension line optically, the entire virtual image cannot be visually observed as described hereinabove with reference to FIGS. 5 and 6. Thus, the necessity arises for adjusting the position of the display unit 11.

Figure 14:
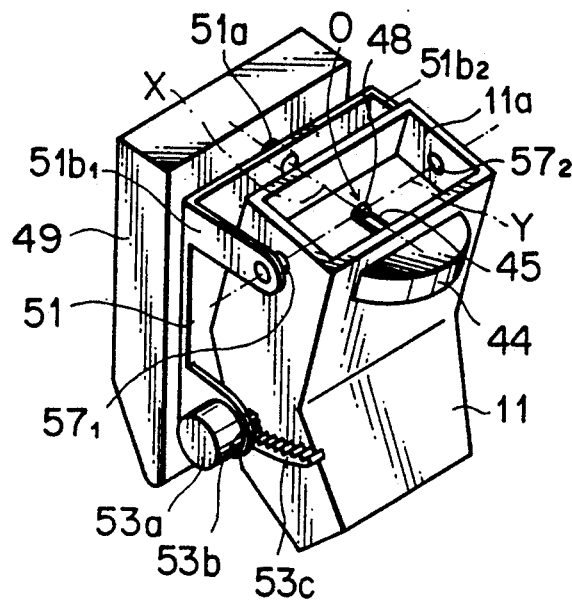
FIG. 14 is a perspective view showing a mounting mechanism for the display unit shown in FIG. 13.
Figure 15:
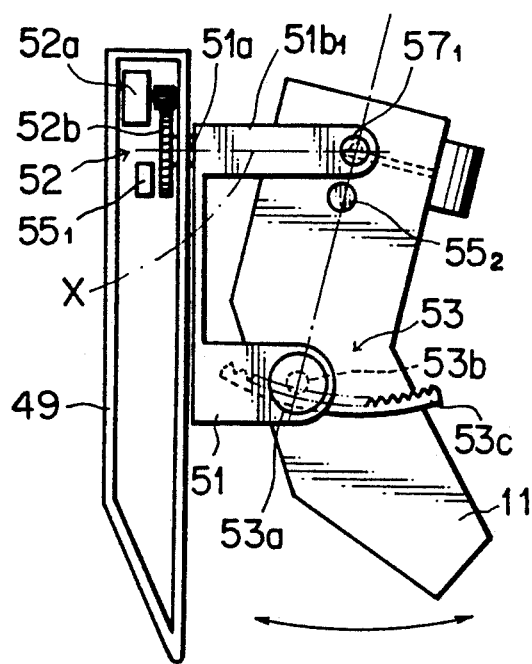
FIGS. 15 and 16 are a side elevational view and a front elevational view, respectively, of the mounting mechanism shown in FIG. 14.
Figure 16:
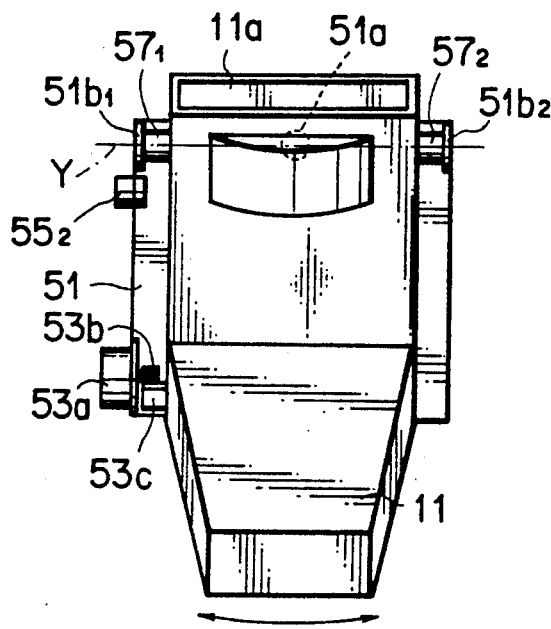

Referring now to FIGS. 14 to 16, there is shown a mounting mechanism for the display unit 11. A fixed box 49 is formed in the chin cover 5a, and a unit coupler 51 holding the display unit 11 thereon is supported at an upper end portion thereof for leftward and rightward rocking motion about a supporting pin 51a on a front wall of the fixed box 49 adjacent a free end of the chin cover 5a. The unit coupler 51 constitutes a unit driving mechanism 54 together with an X-axis driving mechanism 52 and a Y-axis driving mechanism 53.

A pair of forward projecting holding arms $51b_1$ and $51b_2$ are formed at the opposite ends of an upper portion of the unit coupler 51. The display unit 11 is supported for forward and backward rocking motion on and between the holding arms $51b_1$ and $51b_2$ about a common axis of a pair of support shafts $57_1$ and $57_2$ secured to the opposite side walls of the display unit 11 adjacent the top opening 11a.

A pivotal axis X of the supporting pin 51a on which the unit coupler 51 is supported for pivotal motion and another pivotal axis Y of the supporting shafts $57_1$ and $57_2$ which are supported for rotation by the holding arms $51b_1$ and $51b_2$, respectively, extend perpendicularly to each other, and the display unit 11 can be changed in orientation about a fulcrum O provided by an intersecting point between the pivotal axes X and Y with respect to the fixed box 49 and hence to the helmet 5.

Referring particularly to FIG. 15, the X-axis driving mechanism 52 pivots, upon energization of a motor 52a for the X-axis driving, the supporting pin 51a by way of a speed reducing gear 52b to rock the display unit 11 as indicated by a double-sided arrow mark shown in FIG. 16. On the other hand, the Y-axis driving mechanism 53 rotates, upon energization of another motor 53a for the Y-axis driving secured to the unit coupler 51, a pinion 53b to move an arcuate rack 53c mounted on one of the side walls of the display unit 11 and held in meshing engagement with the pinion 53b to rock the display unit 11 as indicated by a double-sided arrow mark shown in FIG. 15.

One of the angle sensors 55, that is, an X angle sensor $55_1$, is disposed adjacent the speed reducing gear 52b of the X-axis driving mechanism 53 while the other angle sensor 55, that is, a Y angle sensor $55_2$, is disposed in the proximity of the supporting shaft $57_1$ and the holding arm $51b_1$ of the unit coupler 51. Then, in response to a rocked position of the display unit 11, the X angle sensor $55_1$ and the Y angle sensor $55_2$ detect an angle of rocking motion about the pivotal axis X and an angle of rocking motion about the pivotal axis Y from a preset position, respectively, and such detection signals are individually inputted to the controlling circuit 56. Such angle sensors $55_1$ and $55_2$ may be potentiometers which are operated in response to the speed reducing gear 53b and supporting shaft $41_1$.

Referring to FIG. 14, a mechanical section 44 in the form of a swollen portion of a case is formed on a wall of the display unit 11 adjacent the opening 11a opposite to the supporting pin 51a, and a supporting bar 45 extends from within the mechanical section 44 into the opening 11a and has a light emitting diode (LED) 48 mounted on an upper face of an end thereof. The LED 48 serves as a reference light source as hereinafter described more in detail.

Referring to FIG. 17 showing the inside of the mechanical section 44, and LED moving motor 47 is connected to a pivot shaft 45a of the supporting bar 45 through a speed reducing gear 46 so that the supporting bar 45 may be pivoted as indicated by a double-sided arrow mark in FIG. 17 upon energization of the motor 47. The range of such pivotal motion is set in accordance with a direction of rotation of the motor 47 and a preset driving amount, and as shown in FIG. 18. The range is set to 90 degrees between a position wherein the LED 48 at the end of the supporting bar 45 is positioned at the center of the opening 11a as shown by a solid line in FIG. 18 and another position wherein the LED 48 is accommodated in the display unit 11 as shown in phantom in FIG. 18. Further, the position of the LED 48 is set such that, when the supporting bar 45 is pivoted to the center side of the opening 11a, it coincides with the intersecting point between the pivotal axes X and Y, that is, the fulcrum O.

Referring now to FIG. 19, there is shown electrical construction of the display apparatus shown in FIG. 12. Though not particularly shown, the controlling circuit 56 of the display apparatus may be constituted from a microcomputer, driving circuits for driving the individual motors 52a, 53a and 47 independently of each other, a driving circuit for lighting and extinguishing the LED 48, an input circuit for inputting coordinates of a depressed portion of the touch panel 40, another input circuit for inputting angle signals from the X angle sensor $55_1$ and the Y angle sensor $55_2$, and so forth. The motors 52a, 53a and 47, the LED 48, the touch panel 40, the X angle sensor $55_1$, the Y angle sensor $55_2$, a power source circuit 58 and a manual switch 59 which is operated upon starting of angle adjustment are all connected to the controlling circuit 56.

Figure 20:
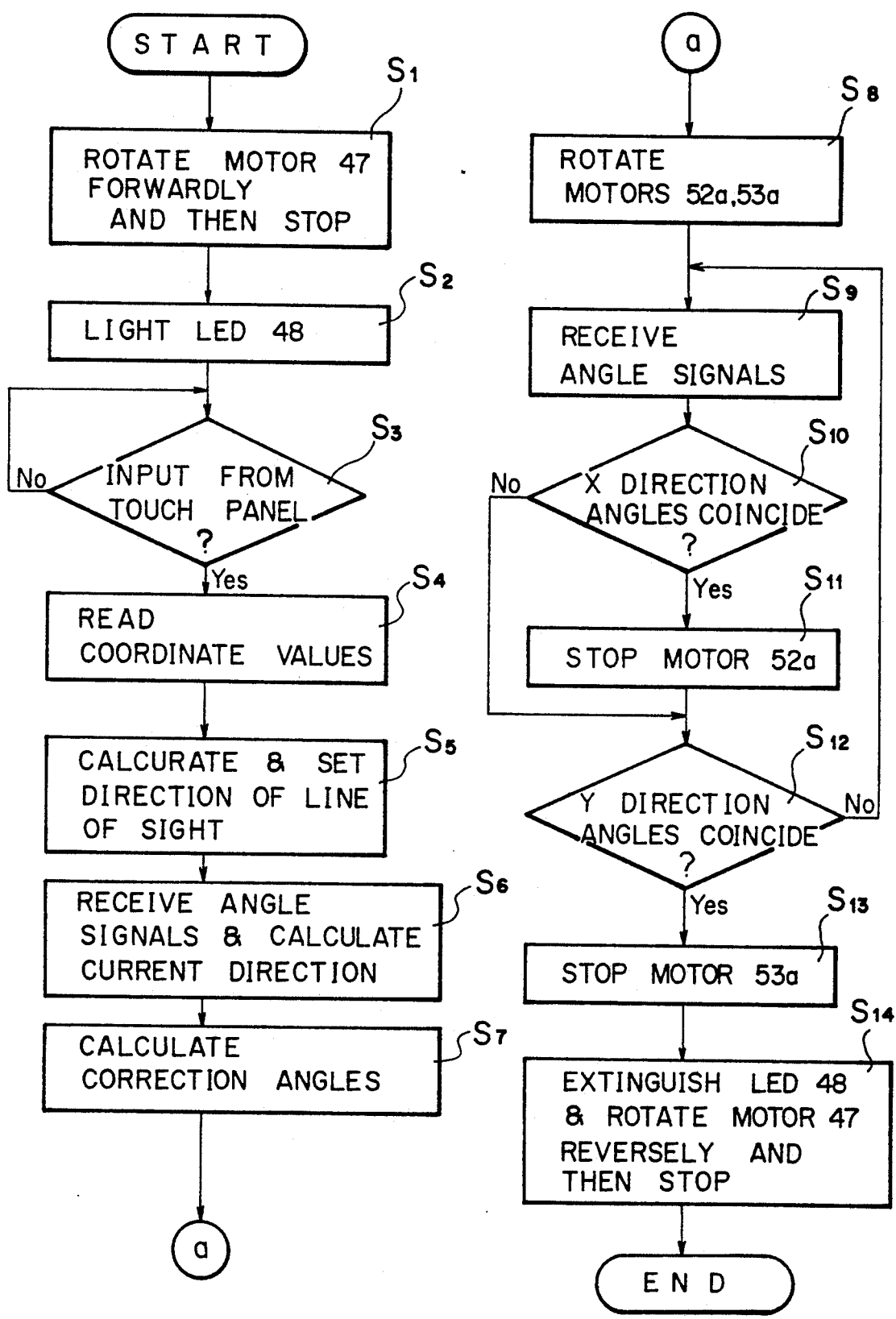
FIG. 20 is a flow chart illustrating operation of the display apparatus of FIG. 12.

Referring to FIG. 20, there is shown a flow chart of a control flow which is executed by the microcomputer of the controlling circuit 56, and the control flow is started upon occurrence of an interruption by operation of the manual switch 59.

After the manual switch 59 is turned on, the motor 47 is driven to move the LED 48 to the position of the fulcrum O at which it is stopped (step $S_1$), and then the LED 48 is lit (step $S_2$), whereafter an input from the touch panel 40 is monitored (step $S_3$), Here, if the touch panel 40 is depressed and an input is detected, then coordinate values of the depressed portion on the touch panel 40 are read from the input signal (step $S_4$).

Then, a position of a point on the shield 6 corresponding to the depressed point from the fulcrum O, that is, to the direction of a line of sight, is determined in accordance with the thus read coordinate values of the depressed point on the touch panel 40 and coordinate values of the fulcrum O stored in advance in the microcomputer (step $S_5$). It is to be noted that the direction of a line of sight is determined as an angle about the pivotal axis X and an angle about the pivotal axis Y with reference to a direction of the optical axis L when the display unit 11 is in a preset direction, that is, in a reference optical axis direction.

Meanwhile, angle signals are received from the X angle sensor $55_1$ and the Y angle sensor $55_2$, and a current direction of the optical axis L of the display unit 11 is determined as an angle about the pivotal axis X and an angle about the pivotal axis Y with reference to the reference optical axis direction (step $S_6$).

Subsequently, the angle of the current direction of the optical axis L determined at step $S_6$ is subtracted from the angle of the direction of the line of sight determined at step $S_5$ to determined correction angles about the pivotal axis X and the pivotal axis Y, respectively (step $S_7$).

Then, the motors 52a and 53a are driven to rotate independently of each other in directions determined in accordance with the correction angles obtained at step $S_7$ so that the optical axis L may coincide with the direction of the line of sight (step $S_8$). While angle signals from the X angle sensor $55_1$ and the Y angle sensor $55_2$ are inputted (step $S_9$), coincidence between the current angles of the optical axis L and the angles of the direction of the line of sight about the pivotal axis X and the pivotal axis Y is monitored (step $S_{10}$ and step $S_{12}$).

Then, if coincidence about the pivotal axis X is detected, then the motor 52a is stopped (step $S_{11}$). If coincidence about the pivotal axis Y is detected, then the motor 53a is stopped (step $S_{13}$).

After both of the motors 52a and 53a are stopped thereby completing the angle correction in this manner, the LED 48 is extinguished and the motor 47 is driven to rotate in reverse to accommodate the LED 48 into the case of the display unit 11 (step $S_{14}$).

The angle correction mentioned above will be described subsequently using an example of angle correction about the pivotal axis Y with reference to FIGS. 21 and 22.

While the optical axis L of the display unit 11 is directed, before angle correction is performed, in a direction in which it does not satisfy a requirement for reflection on the face of the shield 6 with respect to the visual point E, a user can visually observe an image of the LED 48, which emits light at the position of the fulcrum O, at a point P at which a requirement for reflection is satisfied on the shield 6.

Thus, if the user depresses a portion on the touch panel 40 corresponding to the point P while observing the image of the LED 48, then such control as described above is executed so that the optical axis L of the display unit 11 is turned by a correction angle $\theta$. Consequently, the optical axis L is directed toward the point P as seen in FIG. 22. Here, since the optical axis L passes the position of the LED 48 (visual point O) when the user depresses the touch panel 40, the optical axis L is directed optically toward the visual point E. Accordingly, when observed from the visual point E, an appropriate display image of the display unit 11 can be visually observed. Also, angle correction is made in a similar manner around the pivotal axis X, that is, for leftward or rightward movement of the display position.

In this manner, only if a user depresses a position at which the LED 48 is observed, the orientation of the display unit 11 is adjusted automatically, and an appropriate display image can be visually observed in accordance with a visual point position. Further, since such adjustment is simple, the display apparatus can employ even a display unit with which a cut of a display or the like takes place readily, and the bore of the optical system can be made to reduce the display unit in size. Further, also an effect is obtained that, due to the reduction in the size of the bore, it is difficult for external light to be admitted into the display unit.

While the single LED 48 which emits light at the position of the fulcrom O is employed as a reference light source in the embodiment described above, any reference light source may be employed which can indicate to a user a position of the fulcrum O by way of an image reflected by the shield. For example, a plurality of point light sources may be disposed around the display unit 11 centered at the fulcrum O such that it may surround the opening 11a so that reflection images of the plurality of point light sources by the shield may be visually observed by a user. Thus, the user may depress the center of the plurality of images to effect such angle corrections as described above. Or else, it may be a frame corresponding to the opening 11a.

Figure 23:
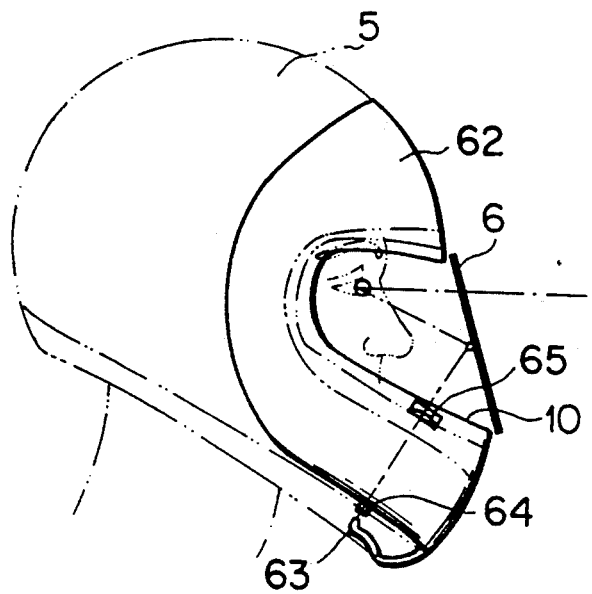
FIG. 23 is a schematic side elevational view of a display apparatus showing a fifth embodiment of the present invention.
Figure 24:
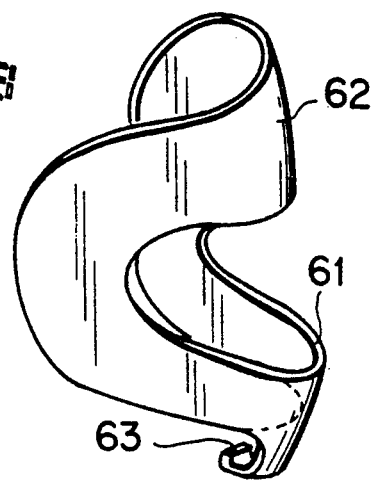
FIG. 24 is a perspective view of a light collecting plate of the display apparatus of FIG. 23.

Referring now to FIGS. 23 and 24, there is shown a display apparatus according to a fifth embodiment of the present invention. The display apparatus is incorporated in a helmet 5 having an opening 10 for the visual observation formed in a front wall thereof, and a transparent shield 6 is mounted on the helmet 5 so as to cover the opening 10. A light collecting plate 62 made of a fluorescent plastic or the like is mounted on the front wall of the helmet 5 such that it covers over a portion of the front wall of the helmet 5 other than the shield 6. The light collecting plate 62 has another opening 61 a little greater than the opening 10 of the helmet 5 formed in a front wall thereof as particularly seen in FIG. 24. A light emitting portion 63 for collecting light irradiated upon the light collecting plate 62 to emit light in a concentrated manner is formed at a central portion of a lower end of the light collecting plate 62 and extends inwardly from a lower end edge of the helmet 5.

A liquid crystal element 64 serving as a display element for displaying desired display information thereon is disposed in the proximity of the light emitting portion 63 of the light collecting plate 62 on the inner side of the helmet 5. The liquid crystal element 64 is of the backlight type similarly to the liquid crystal element 12 of the display apparatus of FIG. 1 described hereinabove, and irradiated light from the light emitting portion 63 of the light collecting plate 62 is used as backlight for the liquid crystal element 64. A lens 65 is disposed adjacent the opening 10 on the inner side of the helmet 5 such that an image of display information of the liquid crystal element 64 may be formed on an inner face of the shield 6.

With the display apparatus of the present embodiment, external light is collected by the light collecting plate 62, and such collected light is irradiated from the light emitting portion 63 of the light collecting plate 62 upon a rear side of the liquid crystal element 64. The irradiated light is selectively transmitted through the liquid crystal element 64 in accordance with a display signal applied to the liquid crystal element 64 so that an image of the display information is formed on the inner face of the shield 6 by way of the lens 65. Consequently, a virtual image 66 of the display information is visually observed by an observer or wearer of the helmet 5.

In this instance, very intense light can be collected by the light collecting plate 62 when the illuminance of external light is high such as when the sky is clear or in a counterlight condition or the like. In such cases, the illuminance of light to be irradiated from the light emitting portion 63 is also high. On the other hand, when the illuminance of external light is low such as when the sky is cloudy or rainy, such weak light is collected by the light collecting plate 62, and accordingly, the illuminance of light irradiated from the light emitting portion 63 is low. As a result, with the display apparatus of the present embodiment, light of a suitable intensity with respect to the illuminance of external light can be irradiated upon the liquid crystal element 64.

When external light cannot be collected such as at night, light is irradiated upon the liquid crystal element 64 by means of a light source not shown. In this case, the light collecting plate 62 made of a fluorescent plastic material as described above emits light from the light source. Consequently, the helmet 5 can be recognized readily from the outside, thereby contributing considerable to the user's safety when driving at night.

In this manner, with the display apparatus of the present embodiment, light of a suitable intensity with respect to an illuminance of external light can be irradiated upon the liquid crystal element 64. Thus, a brightness of 30,000 $Cd/m^2$ can be obtained with the display apparatus of the present embodiment while the brightness of a conventional display apparatus which employs a CRT or an LED is only 9,000 to 10,000 $Cd/m^2$. Consequently, with this display apparatus, display information can be displayed with a suitable brightness on the shield 6 and the virtual image 66 of display information can be visually observed well.

It is to be noted that it is possible to apply the helmet 5 with the display apparatus not only the operation of aircraft and helicopters but also to the operation of an automobile, a motorcycle and the like.

Referring now to FIGS. 25 to 30, there is shown a display apparatus according to a sixth embodiment of the present invention. The display apparatus is also incorporated in a helmet 5 and includes a light collecting plate 62 formed from a resin such as an acrylic resin containing fluorescent material. The light collecting plate 62 is disposed over the entire area of an outer face of the helmet 5 while a light emitting portion 63 for collecting light irradiated upon the light collecting plate 62 to emit light in a concentrated manner is formed at a central portion of a lower end of the light connecting plate 62 and extends inwardly from a lower end edge of a front portion of the helmet 5. A tubular light source 67 is disposed in the proximity of the light emitting portion 63 of the light collecting plate 62 such that light from the light source 67 may pass through the light collecting plate 62 and be irradiated from the light emitting portion 63 and an outer face of the helmet 5.

A display unit 68 that is substantially L-shaped in side elevation is disposed in the proximity of the light emitting portion 63 of the light collecting plate 62 on the inner side of a front wall of the helmet 5 such that upper and lower end portions thereof may be positioned on the front side of the helmet 5. A liquid crystal element 64 serving as a display element for displaying desired display information thereon is disposed at a lower end portion of the display unit 6. The liquid crystal element 64 is also of the backlit type in that irradiated light from the light emitting portion 63 of the light collecting plate 62 is used as backlighting for the liquid crystal element 64. A reflecting plate 69 is disposed on the inner side of the bent corner of the display unit 68 while an optical unit (not shown) including a plurality of lenses is disposed at an upper end of the display unit 68 such that an image of display information from the liquid crystal element 64 may be formed on an inner face of the shield 6.

As particularly seen in FIG. 28, one or more emblems 70 each in the form of a character, a figure or the like may be formed at an arbitrary location of a surface of the light collecting plate 62 by forming a recessed groove 71 on the surface of the light collecting plate 62 as particularly seen in FIGS. 29 and 30. The emblem or emblems 70 are displayed such that, when light is irradiated from the light source 67 to cause the light collecting plate 62 to emit light, light is emitted in a concentrated manner from the recessed groove 71 of the light collecting plate 62 such that the emblem or emblems 70 will appear bright against a dark background.

With the display apparatus of the present embodiment, external light is collected from the light collecting plate 62 to irradiate light upon the rear side of the liquid crystal element 64 of the display unit 68 from the light emitting portion 63 of the collecting plate 62. Thereupon, light is selectively transmitted through the liquid crystal element 64 in accordance with an image displayed on the liquid crystal element 64 in response to a display signal applied thereto. The display image is reflected by the reflecting mirror 69 and forms an image on the inner face of the shield 6 by way of the optical unit. Consequently, a virtual image of the display information is visually observed by an observer.

Also with the display apparatus of the present embodiment, since light of a suitable illuminance with respect to an illuminance of external light is irradiated upon the liquid crystal element 64 similarly as in the embodiment described just above, display information can be displayed with a suitable brightness on the inner face of the shield 6 and the display information can be visually observed well. Further, in case external light cannot be collected, light is irradiated from the light source 67 upon the light collecting plate 12 so that light may be irradiated from the light emitting portion 63 of the light collecting plate 62 upon the liquid crystal element 64. In this instance, since also the light collecting plate 62 is caused to emit light from the light source 67, the helmet 5 can be recognized readily from the outside, thereby significantly contributing to the safety of the user.

Figure 25:
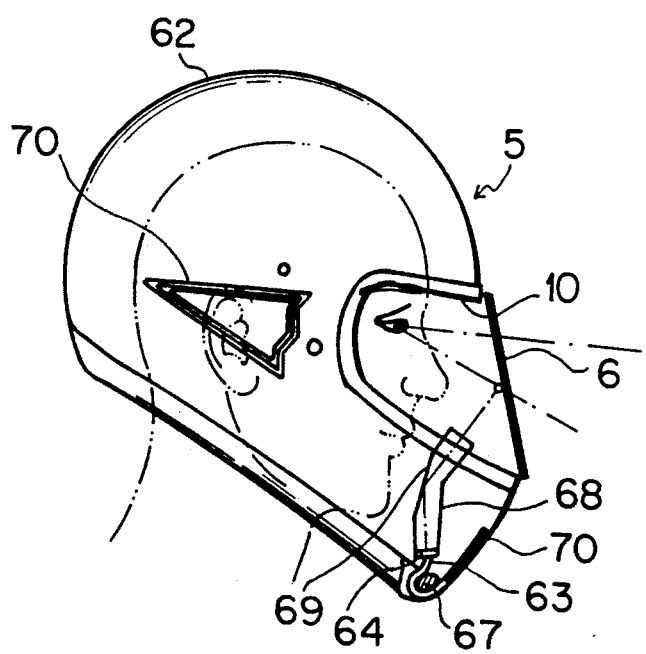
FIG. 25 is a side elevational view of a further helmet in which a display apparatus is incorporated showing a sixth embodiment of the present invention.
Figure 26:
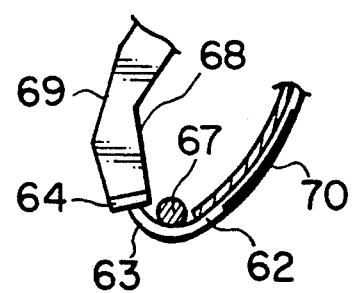
FIG. 26 is an enlarged vertical sectional view of part of a display unit of the display apparatus of FIG. 25.
Figure 27:
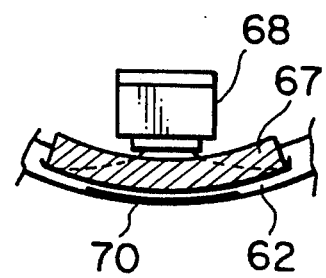
FIG. 27 is an enlarged transverse sectional view of the display apparatus shown in FIG. 25.

Referring now to FIG. 31, there is shown a modification to the display apparatus of the embodiment shown in FIG. 25. The modified display apparatus is only different from the display apparatus of FIG. 25 in that the light source 67 is disposed at a lower end portion of a rear portion of the helmet 5.

Also with the modified display apparatus, since light of a suitable intensity with respect to an illuminance of external light can be irradiated, display information can be displayed with a suitable degree of brightness on the inner face of the shield 6 and the display information can be visually observed well. Further, light can be irradiated from the light emitting portion (not shown) of the light collecting plate 62 by irradiating light from the light source 67 upon the light collecting plate 62. In this instance, the light collecting plate 62 emit light. Consequently, the helmet 5 can be recognized readily from the outside, thereby again contributing to the safety of the operator.

Referring now to FIG. 32, there is shown a display apparatus according to a seventh embodiment of the present invention. The display apparatus is also applied to a helmet that a driver of a motorcycle or the like wears. The helmet 5 has an opening 10 for visual observation formed in a front wall thereof, and a transparent shield 6 is mounted on the helmet 5 so as to cover opening 10.

A display unit 73 is disposed on the inner side of a chin cover or chin portion 5a of the helmet 5, and display light emerging from an upper face of the display unit 73 is directed toward a left-hand side display location $A_L$ and a right-hand side display location $A_R$ set symmetrically with each other on the shield 6 by way of a pair of openings 74a and 74b formed in a nose guard 74 of the helmet 5. Reflected light from the left-hand side display location $A_L$ and the right-hand side display location $A_R$ is directed respectively to left and right visual point positions $E_L$ and $E_R$ set in the inside of the helmet 5.

Referring to FIG. 33, an optical system of the display apparatus is shown in detail including the display unit 73. The optical system includes a display element 731 of the self light emitting type such as a liquid crystal display device with backlighting a fluorescent display tube is disposed in a case body 73a of the display unit 73. The display element 731 emits light of a display pattern for the display of speed.

A convex lens 732 is disposed adjacent a front or display surface of the display element 731 such that an optical axis L thereof may take the right angle with respect to the display surface of the display element 731, and a beam splitter 733 such as a half mirror is disposed on the optical axis L of the convex lens 732 in an inclined relationship by 45 degrees with respect to the optical axis L. It is to be noted that the beam splitter 733 is set such that the reflection factor and transmission factor thereof may each be about 50% with respect to light from the convex lens 732.

A first reflecting mirror 734 is disposed on a path of light reflected from the beam splitter 733 while a second reflecting mirror 735 is disposed on a path of light transmitted through the beam splitter 733. A third reflecting mirror 736 is disposed on a path of light reflected from the second reflecting mirror 735.

A correcting optical system 737 is disposed on a path of light reflected from the first reflecting mirror 734 adjacent one of pair of openings 739 formed in the case body 73a of the display unit 73, and another correcting optical system 738 is disposed on a path of light reflected from the third reflecting mirror 736 adjacent the other opening 739. It is to be noted that the correcting optical systems 737 and 738 are provided each to correct distortion of an image which is caused by the curve of the shield 6.

Beams of light from the correcting optical systems 737 and 738 are directed toward the display locations $A_L$ and $A_R$ on the shield 6, respectively, and the left and right visual point positions $E_L$ and $E_R$ are positioned on paths of beams of light reflected from the display locations $A_L$ and $A_R$, respectively. Extension lines of optical axes interconnecting the visual point positions $E_L$ and $E_R$ and the display locations $A_L$ and $A_R$, respectively, intersect each other at a point in front of the shield 6, and a virtual image I of a display image by the display element 731 is formed at the intersecting point or virtual image coupling position B.

Where the distance from the beam splitter 733 to the first reflecting mirror 734 is represented by a, the distance from the beam splitter 733 to the second reflecting mirror 735 is represented by $b_1$, the distance from the second reflecting mirror 735 to the third reflecting mirror 736 is represented by $b_2$, the distance of an optical path from the first reflecting mirror 734 to the virtual image coupling point B is represented by $l_R$ and the distance of another optical path from the third reflecting mirror 736 to the virtual image coupling point B is represented by $l_R$. These distances are related through an expression $$l_R + a = l_R + b_1 + b_2$$

Figure 34:
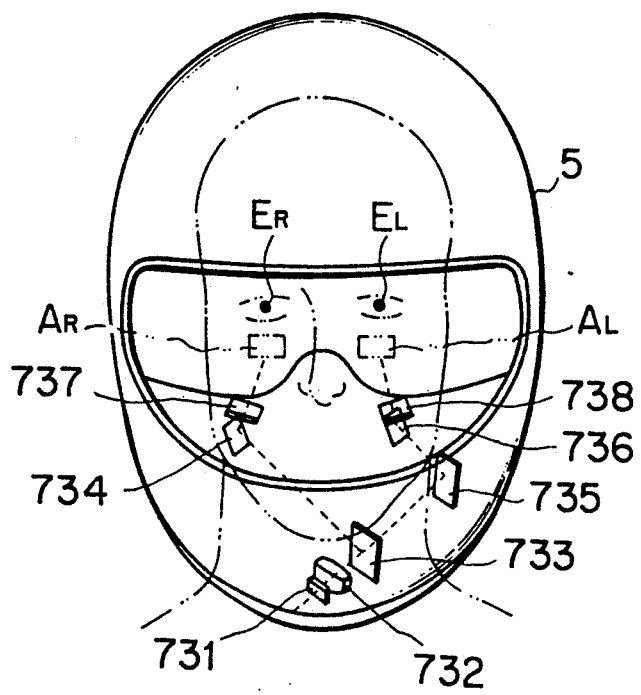
FIG. 34 is a schematic front elevational view illustrating a positional relationship between the helmet and the optical system of the display apparatus of FIG. 32.

The convex lens 732 and the correcting optical systems 737 and 738 are individually set such that a virtual image of a display image of the display element 731 may be formed at the position of the virtual image coupling point B. It is to be noted that the positional relationship between the optical system described above and the helmet 5 is such as shown in FIG. 34. Meanwhile, the visual point positions $E_L$ and $E_R$ are set to positions of the left and right eyes when a user wears the helmet 5.

Accordingly, a user can visually observe a virtual image I of a display image in a field of view of the shield 6 with bath eyes while the helmet 5 is worn, and the virtual image I can be visually observed with such a natural and comfortable feeling that it actually is at the virtual image coupling position B forwardly of the shield 6. Further, since the display unit 73 is accommodated in the chin cover 5a, it will not be an obstruction to a user. Further, the display apparatus is constructed only by combining simple optical systems such as a reflecting mirror, a convex lens and so forth, and the entire apparatus is simple and light in weight.

Figure 35:
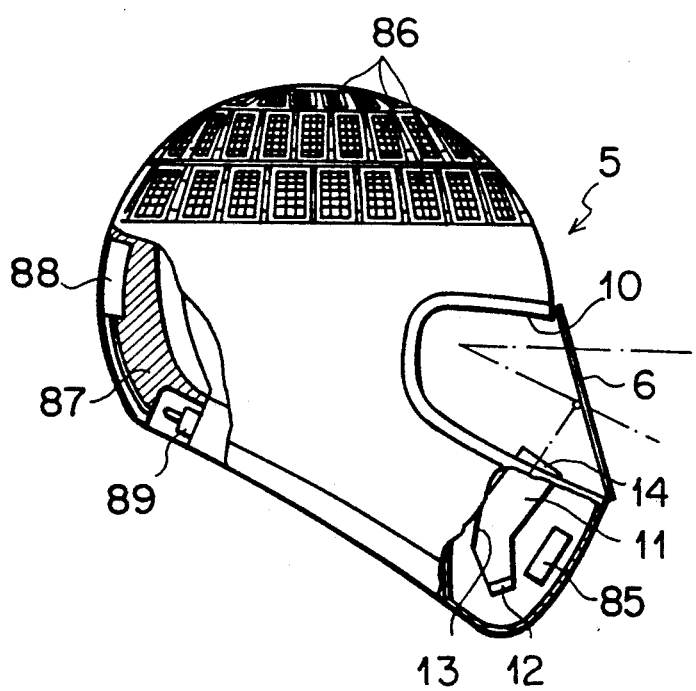
FIG. 35 is a side elevational view, partly in section, of a yet further helmet in which a display apparatus is incorporated showing an eighth embodiment of the present invention.

Referring now to FIG. 35, there is shown a display apparatus according to an eighth embodiment of the present invention. The display apparatus is also applied to a helmet 5 which has an opening 10 for the visual observation formed in a front wall thereof, and a transparent shield 6 is mounted on the helmet 5 so as to cover the opening 10.

A display unit 11 that is substantially L-shape in side elevation is disposed on the inner side of a front wall of the helmet 5 such that upper and lower end portions thereof may be positioned on the front side of the helmet 5. A liquid crystal element 12 serving as a display element for displaying desired display information thereon is disposed at a lower end portion of the display unit 11. The liquid crystal element 12 is also of the backlit type in that irradiated light from a light source not shown disposed below the liquid crystal element is used as backlighting therefor. A reflecting plate 13 is disposed on the inner side of a bent corner of the display unit 11 while an optical unit 14 including a plurality of lenses is disposed at an upper end portion of the display unit 11 such that an image of display information from the liquid crystal element 12 may be formed on an inner face of the shield 6.

Figure 36:
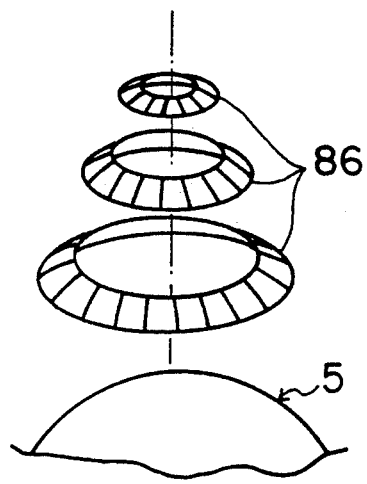
FIG. 36 is a fragmentary perspective view of a solar battery of the display apparatus of FIG. 35.
Figure 37:
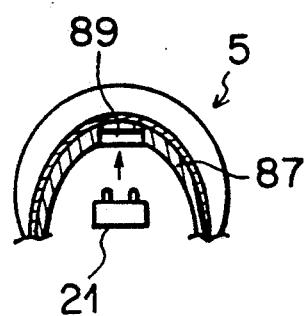
FIG. 37 is a schematic bottom plan view of part of the helmet of FIG. 35.

A driving controlling circuit 85 for driving the display unit 11 is disposed on the front side of the display unit 11 while solar batteries 86 each in the form of a flexible thin annular ring as shown in FIG. 36 are adhered to an upper portion of an outer face of the helmet 5. At a rear location in the inside of the helmet 5, an internal battery 88 is disposed on a shock absorbing liner 87 provided on the inner face of the helmet 5. A charging terminal 89 is mounted in the inside of the helmet 5 as shown in FIG. 37.

Figure 38:
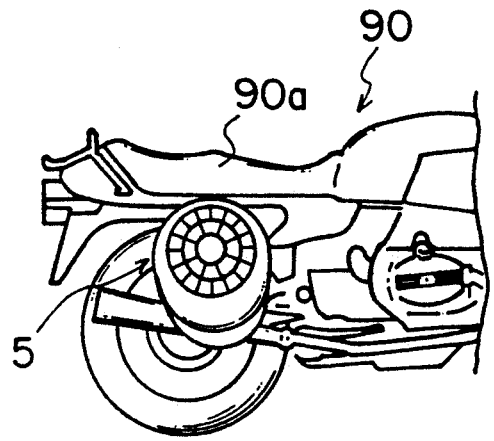
FIG. 38 is a side elevational view of part of a motorcycle.
Figure 39:
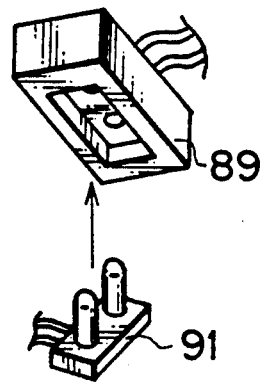
FIG. 39 is a perspective view of charging terminals for electrical connection between a battery of the motorcycle of FIG. 38 and the display apparatus of FIG. 35.
Figure 40:
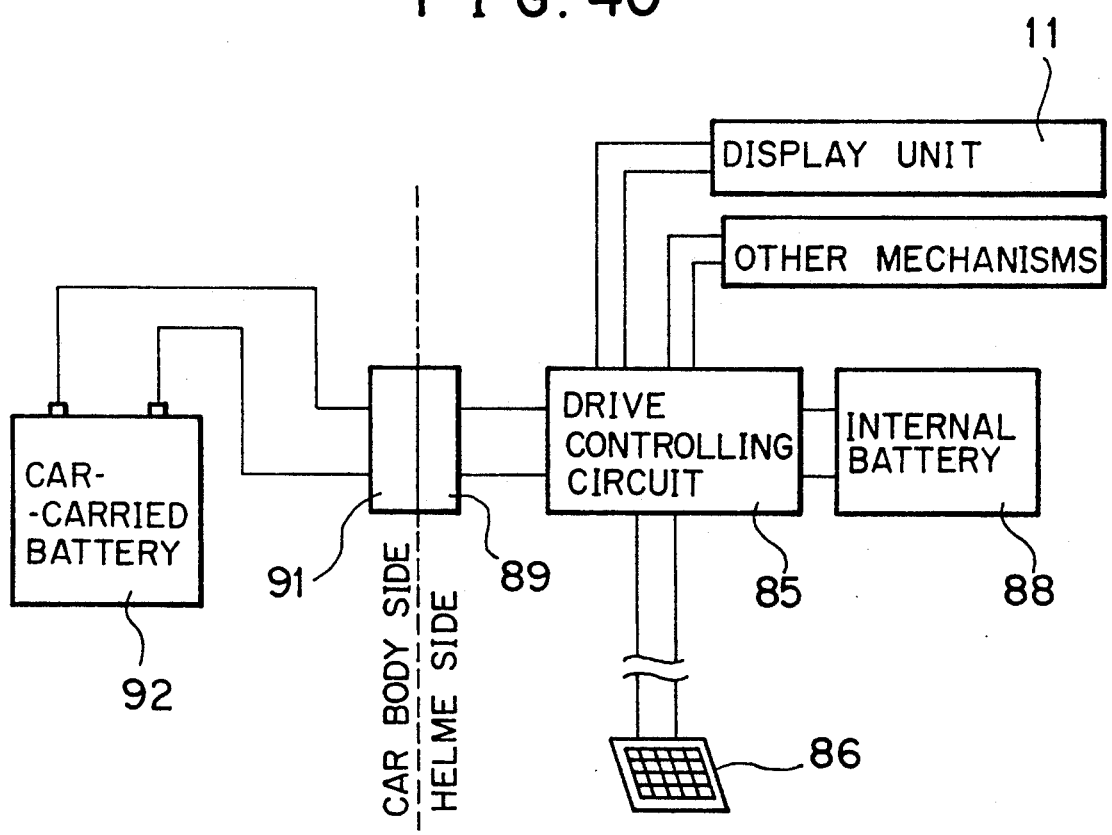
FIG. 40 is a block diagram illustrating electrical connection between the battery of the motorcycle of FIG. 38 and a driving controlling circuit of the display apparatus of FIG. 35.

Referring to FIGS. 38 to 40, another charging terminal 91 adapted to be connected to the charging terminal 89 of the helmet 5 is disposed at a helmet holder (not shown) provided adjacent a seat 90a of a motorcycle 90.

The charging terminal 91 is connected to a car-carried battery 92 of the motorcycle 90.

Referring particularly to FIG. 40, the solar battery 86, internal battery 88 and charging terminal 89 are individually connected to the driving controlling circuit 85, and by the driving controlling circuit 85, it is changed over in response to an output voltage of the solar battery 88 from which one of the solar battery 86 and internal battery 88 power should be supplied. When the charging terminal 89 of the helmet 5 is connected to the charging electrode 91 of the motorcycle 90, the internal battery 88 can be charged from the car-carried battery 92 of the motorcycle 90 in response to a charged condition of the internal battery 88.

In the display apparatus of the present embodiment, light is irradiated upon a rear side of the liquid crystal element 12 from the light source (not shown) and a voltage is selectively applied to the liquid crystal element 12 in accordance with desired display information to form a corresponding display image. Consequently, light from the light source is transmitted through the liquid crystal element 12 in accordance with the display image. The display light of the display image is then reflected by the reflecting plate 13 and projected on the inner face of the shield 6 through the optical unit 14. Consequently, a virtual image is formed at a predetermined position on the outer side of the shield 6, and an observer will visually observe the virtual image and recognize the display image. In this instance, when the illuminance of external light is high such as in the daytime, light of a suitable intensity with respect to an illuminance of external light is irradiated upon the liquid crystal element 12 by adjusting the illuminance of the light source to a high level.

Figure 41:
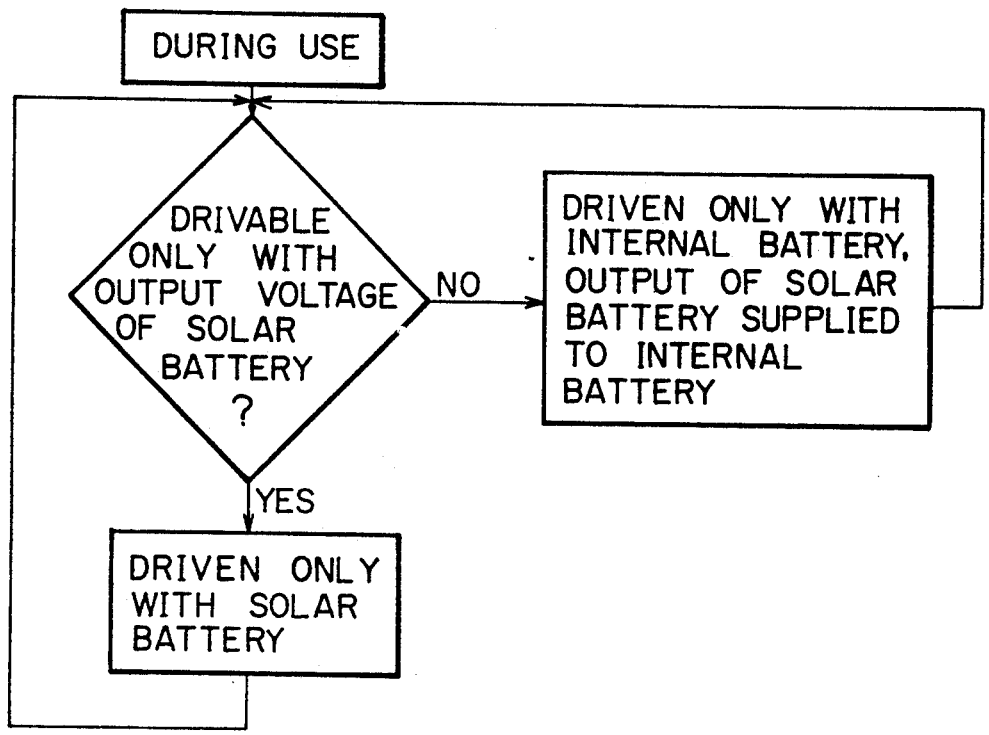
FIGS. 41 and 42 are flow charts illustrating power source supply control of the driving controlling circuit shown in FIG. 40.
Figure 42:
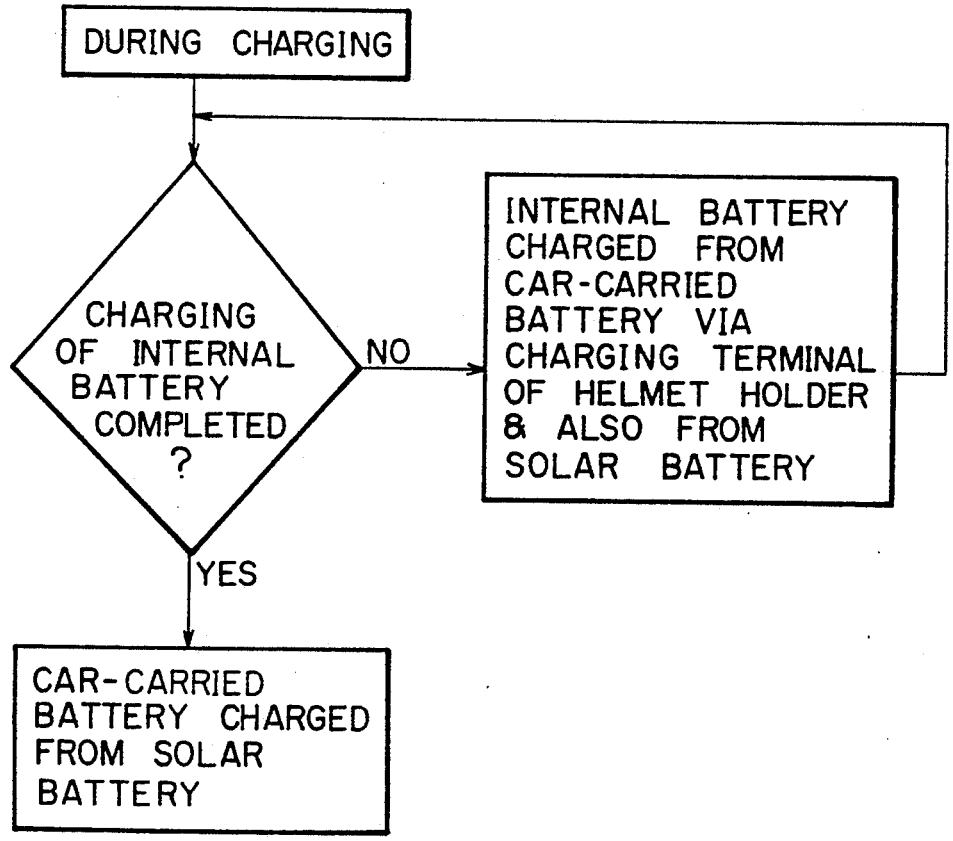
Figure 43:
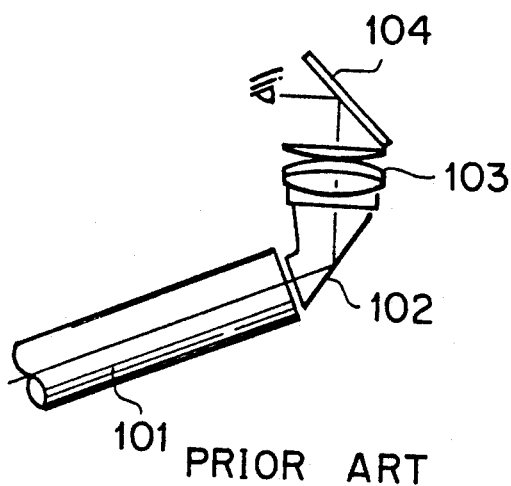
FIG. 43 is a schematic illustration showing a conventional display apparatus.
Figure 44:
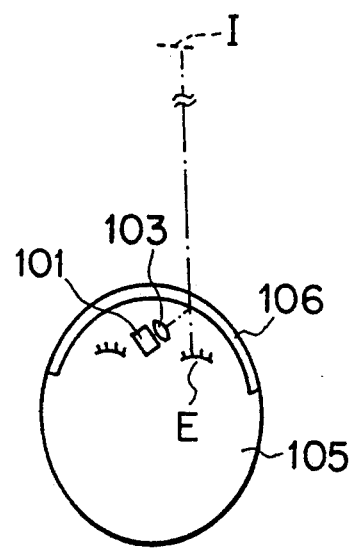
FIG. 44 is a diagrammatic representation showing another conventional display apparatus.
Figure 46:
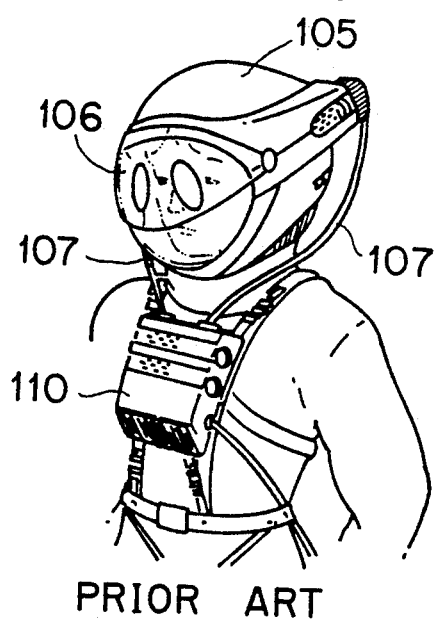
FIG. 46 is a perspective view showing a still further conventional display apparatus.
Figure 45:
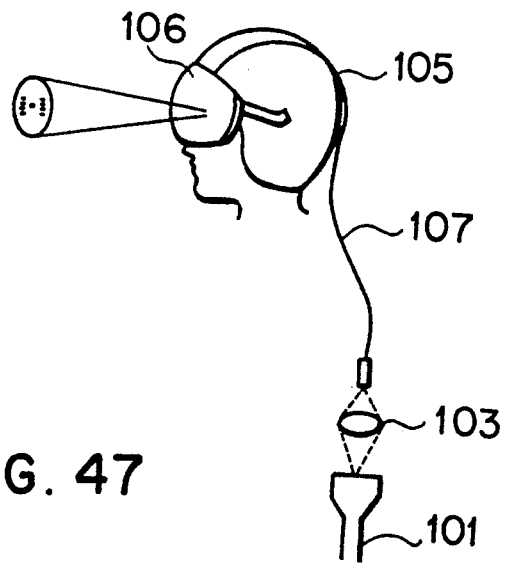
FIG. 45 is a schematic illustration showing a further conventional display apparatus.
Figure 47:
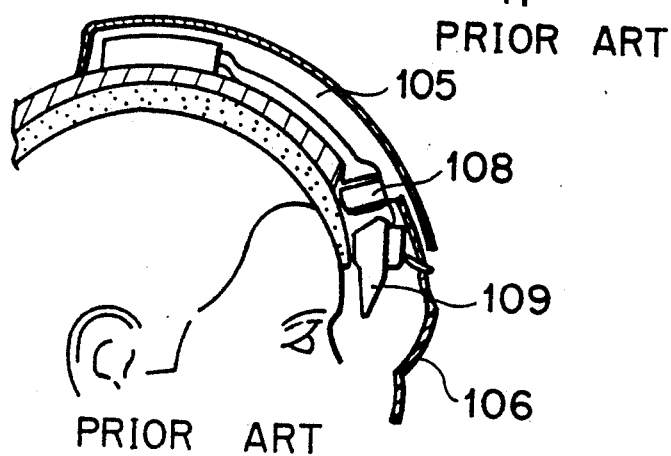
FIG. 47 is a vertical sectional view showing a yet further conventional display apparatus.

Referring to FIG. 41, when the illuminance of external light is so high such as in the daytime that the display unit 11 can be driven only with an output voltage of the solar battery 86, power is supplied from the solar battery 86 to the display unit 11 under the control of the driving controlling circuit 85 to drive the display unit 11. However, when the illuminance of external light is so low such as at night that the display unit 11 cannot be driven only with an output voltage of the solar battery 86, power is supplied from the internal battery 88 to the display unit 11 while an output voltage from the solar battery 86 is supplemented to the internal battery 88.

On the other hand, when the helmet 5 is mounted on the helmet holder of the motorcycle 90 as seen in FIG. 38 when it is not worn, the charging terminal 89 of the helmet 5 is connected to the charging terminal 91 of the motorcycle 90 as indicated by an arrow mark in FIG. 37. Consequently, the internal battery 88 in the helmet 5 is charged from the car-carried battery 92 of the motorcycle 90 while it is also charged from the solar battery 86 of the helmet 5. In case the internal battery 88 of the helmet 5 is charged up already, an output of the solar battery 86 is charged into the car-carried battery 92 by way of the charging terminals 89 and 91.

Thus, with the display apparatus of the present embodiment, since a display image is formed by irradiating light from the light source upon the rear side of the liquid crystal element 12, the display image can be visually observed well.

Further, since power can be supplied from the solar battery 86 or the internal battery 88 either in the daytime or at night and because the internal battery 88 can be charged when the helmet 5 is not worn from the solar battery 86 or the car-carried battery 92, stabilized power is always assured. As a result, a cable for the supply of power is unnecessary, and this constitutes no obstruction to the driver during the operation of the vehicle. Further, since there is no need for exchanging power cells or the like, the convenience of using the helmet is improved very much.

Having now fully described the invention, it will be apparent to one of ordinary skill in the art that many changes and modifications can be made thereto without departing from the spirit and scope of the invention as set forth herein.

What is claimed is:

1. A display apparatus for use with a helmet which has a front opening formed therein and has a transparent shield mounted thereon so as to cover said front opening, said display apparatus comprising:
    a display unit for displaying information thereon, said display unit being disposed on an inner side of a chin portion of said helmet such that display light therefrom is reflected toward a visual point position on an inner face of said shield to allow an observer to visually observe a virtual image of the display information of said display unit from within said helmet through said shield;
    means for supporting said display unit for pivotal motion about two perpendicular axes which intersect each other, said supporting means including a support shaft fixedly connected to said display unit, and holding arms fixedly attached to an interior of the chin portion and adjustably connected to the support shaft; and
    manually operable means for fixing said display unit about the two perpendicular axes with respect to said helmet, said manually operable means including an adjusting shaft connected to said display unit for effecting manual adjustment of said display unit about the two perpendicular axes, and adjustment locking means connected to the adjustment shaft for locking an adjusted position of said display unit.

2. A display apparatus as claimed in claim 1, wherein said display unit is substantially L-shaped in side elevation and is disposed such that a bent corner thereof is remote from a front portion of said helmet, said display unit including a display element for emitting display light in accordance with display information, a reflecting plate disposed at the bent corner of said display unit for reflecting the display light from the display element, and an optical unit for directing the display light reflected from the reflecting plate toward the shield.

3. A display apparatus for use with a helmet which has a front opening formed therein and has a transparent shield mounted thereon so as to cover said front opening, said display apparatus comprising:
    a display unit for displaying information thereon, said display unit being disposed on an inner side of a chin portion of said helmet such that display light therefrom is reflected toward a visual point position on an inner face of said shield to allow an observer to visually observe a virtual image of the display information of said display unit from within said helmet through said shield, wherein
    the chin portion of said helmet is movably mounted on a main body portion of said helmet for movement between two positions with respect to the main body portion of said helmet, said shield being mounted at a lower end thereof for pivotal motion on the chin portion so that the movement of the chin portion changes an inclination of said shield while maintaining said shield in the mounted condition thereon, and said display unit is mounted for rocking motion between two positions about a fixed axis with respect to the main body portion of said helmet, said display unit being rocked in response to movement of the chin portion between the two positions.

4. A display apparatus as claimed in claim 3, further comprising:
    means for driving the chin portion so as to move the chin portion from one to the other of the two positions or vice versa in response to an external signal; and
    means for driving said display unit so as to move said display unit from one to the other of the two positions or vice versa in response to the external signal.

5. A display apparatus as claimed in claim 4, wherein said external signal is a velocity signal which represents a velocity of a vehicle which is driven by the observer.

6. A display apparatus as claimed in claim 3, wherein said display unit is substantially L-shaped in side elevation and is disposed such that a bent corner thereof is remote from a front portion of said helmet, said display unit including a display element for emitting display light in accordance with display information, a reflecting plate disposed at the bent corner of said display unit for reflecting the display light from the display element, and an optical unit for directing the display light reflected from the reflecting plate toward the shield.

7. A display apparatus for use with a helmet which has a front opening formed therein and has a transparent shield mounted thereon in such a manner as to cover said front opening, said display apparatus comprising:
    a display unit for displaying information thereon, said display unit being disposed on the inner side of a chin portion of said helmet such that display light therefrom is reflected toward a visual point position by an inner face of said shield to allow an observer to visually observe a virtual image of the display information of said display unit from within said helmet through said shield;
    means for supporting said display unit for pivotal motion about a fulcrum at a fixed point on or in the proximity of an optical axis of display light from said display unit;
    unit driving means for changing the orientation of said display unit about said fulcrum;
    a reference light source disposed on said display unit for emitting reference light toward said shield to indicate, with a point on said shield at which the reference light is reflected, a position of said fulcrum when said shield is viewed;
    angle detecting means for detecting orientation of said display unit, a transparent touch panel disposed on an outer face of said shield indicating said point thereon as a portion to be depressed; and
    controlling means for identifying said depressed portion on said touch panel and controlling, in accordance with the thus identified depressed position and the orientation of said display unit detected by said angle detecting means, said unit driving means to pivot said display unit so that the optical axis of the display light from said display unit may be directed to the position of the identified depressed portion on said touch panel.

8. A display apparatus as claimed in claim 7, further comprising means for supporting said display unit for pivotal motion about two perpendicular axes which intersect each other at said fulcrum.

9. A display apparatus as claimed in claim 8, wherein said unit driving means includes first and second driving means for driving said display unit to pivot about first and second ones of said two perpendicular axes, respectively, and said angle detecting means includes first and second detecting elements for detecting angular positions of said display unit about the first and second axes, respectively.

10. A display apparatus as claimed in claim 7, wherein said reference light source is a point light source disposed for movement toward and away from a position at or adjacent said fulcrum.

11. A display apparatus for use with a helmet which has a front opening formed therein and has a transparent shield mounted thereon in such a manner as to cover said front opening, said display apparatus comprising:
- a display unit for displaying information thereon, said display unit being disposed in said helmet such that display light therefrom is reflected toward a visual point position by an inner face of said shield to allow an observer to visually observe a virtual image of the display information of said display unit from within said helment through said shield, said display unit being of the backlight type; and
- a light collecting plate mounted on an outer face of said helmet for collecting external light and emitting the thus collected external light toward the back side of said display unit.

12. A display apparatus as claimed in claim 11, wherein said light collecting plate is mounted on a portion of said helmet around said front opening and has an opening formed therein which substantially coincides with said front opening of said helmet.

13. A display apparatus as claimed in claim 11, wherein said light collecting plate is mounted on an entire outer face of said helment and has an opening formed therein which substantially coincides with said front opening of said helment.

14. A display apparatus as claimed in claim 13, further comprising a light source disposed at a rear end portion of said helmet adjacent an end edge of said light collecting plate for emitting light therefrom so as to be introduced into said light collecting plate.

15. A display apparatus as claimed in claim 11, further comprising a light source disposed adjacent said display unit for emitting light therefrom so as to be irradiated also upon the back side of said display unit.

16. A display apparatus as claimed in claim 14 wherein said light collecting plate has an emblem formed thereon which emits light when said light source is caused to emit light and such light is introduced into said light collecting plate.

17. A display apparatus as claimed in claim 15, wherein said light collecting plate has an emblem formed thereon which emits light when said light source is caused to emit light and such light is introduced into said light collecting plate.

18. A display apparatus for use with a helmet which has a front opening formed therein and has a transparent shield mounted thereon in such a manner as to cover said front opening, said display apparatus comprising:
- a display unit for displaying information thereon, said display unit being disposed on the inner side of a chin portion of said helmet such that display light therefrom is reflected toward a visual point position by an inner face of said shield to allow an observer to visually observe a virtual image of the display information of said display unit from within said helmet through said shield;
- a beam splitter for splitting display light from said display unit into two beams of light;
- a first reflecting mirror for reflecting one of the two beams of light from said beam splitter toward said shield;
- a second reflecting mirror for reflecting the other beam of light; and
- a third reflecting mirror for reflecting the beam of light reflected from said second reflecting mirror toward said shield, the beams of light from said first and third reflecting mirrors being reflected at two predetermined left and right symmetrical locations of said shield such that optical axes of the beams of light reflected from said shield are intersected with each other at a predetermined point forwardly of said shield at which the virtual image is formed.

19. A display apparatus as claimed in claim 18, further comprising a convex lens interposed between said display unit and said beam splitter, said display unit being disposed such that a display surface thereof is located between said convex lens and a focus of said convex lens so that the virtual image may be displayed remotely.

* * * * *